US012593753B2

(12) United States Patent　　(10) Patent No.:　US 12,593,753 B2

Bharathwaj et al.　　(45) Date of Patent:　Apr. 7, 2026

(54) AGRICULTURAL CUTTING SYSTEM AND CUT-POINT METHOD

(71) Applicant: KUBOTA CORPORATION, Osaka (JP)

(72) Inventors: Sai Bharathwaj, Bangalore (IN); Jalam Singh, Bangalore (IN); Pavithra Mathighata Nanjundaswamy, Bangalore (IN); Nagarjun Pogakula Surya Prakash, Bangalore (IN); Ridhwan Luthra, Bangalore (IN); Shan Wan, Fremont, CA (US); Pius Ng, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 342 days.

(21) Appl. No.: 18/379,630

(22) Filed: Oct. 12, 2023

(65) Prior Publication Data

US 2024/0282105 A1　　Aug. 22, 2024

Related U.S. Application Data

(60) Provisional application No. 63/447,471, filed on Feb. 22, 2023.

(51) Int. Cl.
　　*G06V 20/10*　　(2022.01)
　　*A01D 46/253*　　(2006.01)
　　　　(Continued)

(52) U.S. Cl.
　　CPC ........... *A01D 46/30* (2013.01); *A01D 46/253* (2013.01); *A01G 17/085* (2013.01); *G06T 7/11* (2017.01);
　　　　(Continued)

(58) Field of Classification Search
　　CPC ........ A01D 46/30; A01D 46/253; G06T 7/11; G06T 7/73; G06T 7/593; G06T 7/50;
　　　　(Continued)

(56) References Cited

U.S. PATENT DOCUMENTS

| | | | |
|---|---|---|---|
| 7,248,968 B2 * | 7/2007 | Reid ..................... | G06V 20/10 |
| | | | 701/116 |
| 11,138,258 B2 * | 10/2021 | De Sheng Deng ... | G06F 16/535 |

(Continued)

FOREIGN PATENT DOCUMENTS

| | | |
|---|---|---|
| JP | 2021-093969 A | 6/2021 |
| JP | 2022-140119 A | 9/2022 |

(Continued)

OTHER PUBLICATIONS

Official Communication issued in International Patent Application No. PCT/IB2024/051552, mailed on Apr. 23, 2024.

(Continued)

*Primary Examiner* — Gregory M Desire

(74) *Attorney, Agent, or Firm* — Keating & Bennett, LLP

(57)　　　　ABSTRACT

A method for generating an agricultural cut-point for an agricultural item includes capturing an image of the agricultural item, generating a depth estimation of the agricultural item, segmenting the image of the agricultural item to generate a segmented image that identifies different segments of the agricultural item, detecting an agricultural feature of the agricultural item based on the image of the agricultural item, generating a two-dimensional cut-point based on the segmented image and the agricultural feature, and generating a three-dimensional cut-point based on the two-dimensional cut-point and the depth estimation of the agricultural item.

24 Claims, 25 Drawing Sheets
(19 of 25 Drawing Sheet(s) Filed in Color)

(51) Int. Cl.

| | |
|---|---|
| *A01D 46/30* | (2006.01) |
| *A01G 17/08* | (2006.01) |
| *G06T 7/11* | (2017.01) |
| *G06T 7/50* | (2017.01) |
| *G06T 7/593* | (2017.01) |
| *G06T 7/73* | (2017.01) |
| *G06V 10/26* | (2022.01) |
| *G06V 10/44* | (2022.01) |
| *G06V 10/774* | (2022.01) |

(52) U.S. Cl.
CPC ............... *G06T 7/50* (2017.01); *G06T 7/593* (2017.01); *G06T 7/73* (2017.01); *G06V 10/26* (2022.01); *G06V 10/44* (2022.01); *G06V 10/774* (2022.01); *G06V 20/188* (2022.01); *G06T 2207/10028* (2013.01); *G06T 2207/20081* (2013.01); *G06T 2207/30188* (2013.01)

(58) Field of Classification Search
CPC . G06T 2207/10028; G06T 2207/20081; G06T 2207/30188; G06V 20/188; G06V 10/44; G06V 10/26; G06V 10/774; A01G 17/085
See application file for complete search history.

(56) References Cited

U.S. PATENT DOCUMENTS

| | | | | |
|---|---|---|---|---|
| 11,195,327 B2 * | 12/2021 | Tham | ..................... | A01G 23/00 |
| 11,596,104 B2 * | 3/2023 | Zhang | ................... | A01D 46/30 |
| 11,769,296 B2 * | 9/2023 | Tham | ..................... | G01C 15/00 |
| | | | | 382/154 |

FOREIGN PATENT DOCUMENTS

| | | | |
|---|---|---|---|
| WO | 2017/175099 | A1 | 10/2017 |
| WO | 2019/060464 | A1 | 3/2019 |
| WO | 2022/187654 | A1 | 9/2022 |

OTHER PUBLICATIONS

Bharathwaj et al., "Agricultural Tool and Process", U.S. Appl. No. 18/379,631, filed Oct. 12, 2023.

Ng et al., "Agricultural Cutting System and Cut-Point Method", U.S. Appl. No. 18/379,632, filed Oct. 12, 2023.

* cited by examiner

Figure 5:
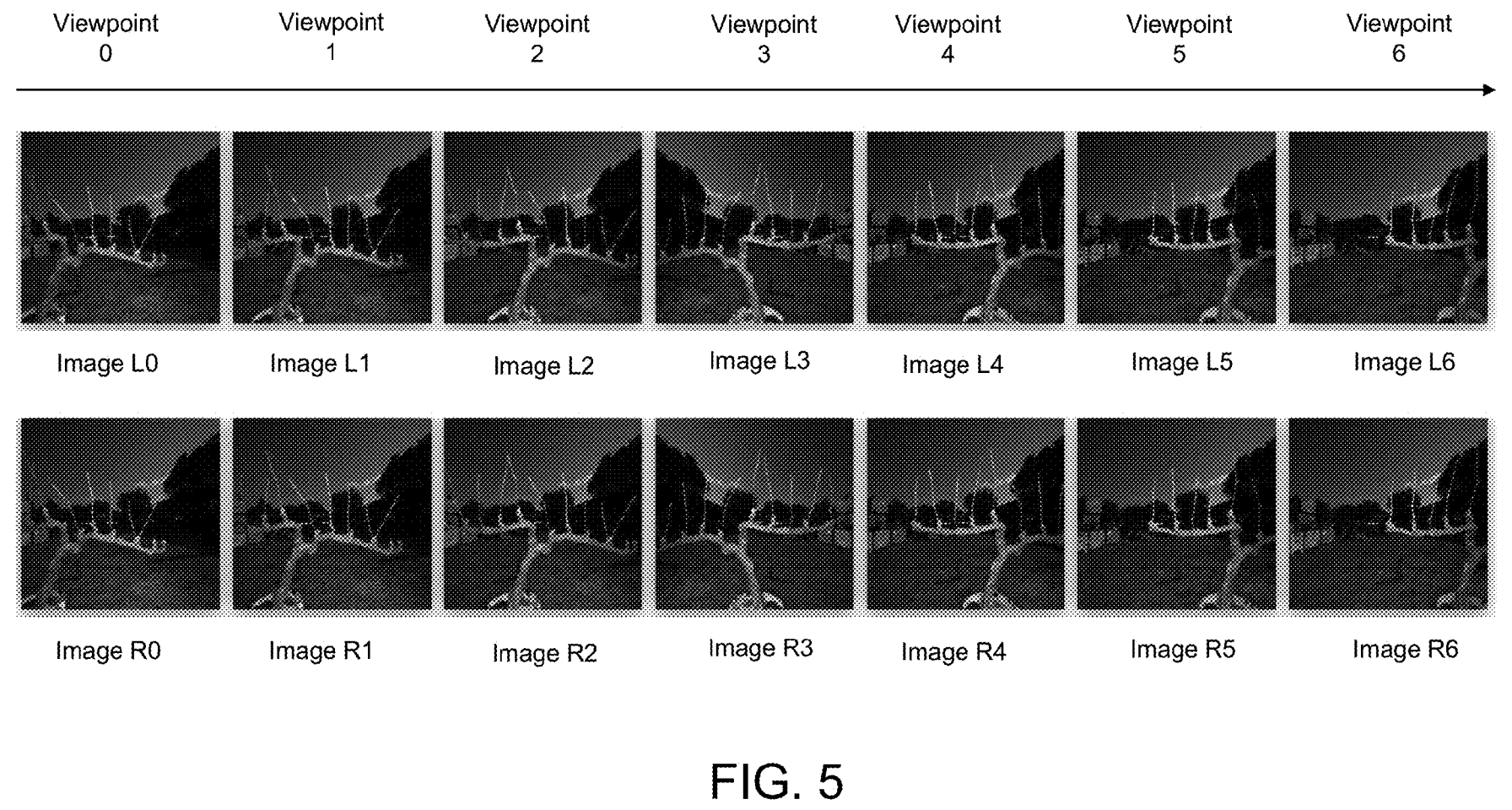

Viewpoint 6    Viewpoint 5    Viewpoint 4    Viewpoint 3    Viewpoint 2    Viewpoint 1    Viewpoint 0

Image L6    Image L5    Image L4    Image L3    Image L2    Image L1    Image L0

Image R6    Image R5    Image R4    Image R3    Image R2    Image R1    Image R0

AGRICULTURAL CUTTING SYSTEM AND CUT-POINT METHOD

CROSS REFERENCE TO RELATED APPLICATIONS

This application claims the benefit of priority to U.S. Provisional Application No. 63/447,471 filed on Feb. 22, 2023. The entire contents of this application are hereby incorporated herein by reference.

BACKGROUND

1. Field of the Invention

The present invention relates to an agricultural cutting system and an agricultural cut-point generation method.

2. Description of the Related Art

Conventionally, agricultural cutting tasks have been manual labor tasks that are expensive and timing-consuming. For example, in a case in which an agricultural item of interest is a grape vine, an agricultural cutting task of pruning the grape vine requires an expertly skilled person to walk through the vineyard and manually perform the pruning of the grape vine. Furthermore, a technique of pruning the grape vine may vary from person to person, which can decrease the reliability and consistency of the pruning of the grape vine. This unreliability and inconsistency is undesirable because it can negatively affect the health and growth of the grape vine and the quality of the grapes produced by the grape vine.

For the foregoing reasons, there is a need for an agricultural cutting system and an agricultural cut-point generation method that can inexpensively and reliably be used to perform a cutting task on an agricultural item of interest and generate a cut-point on the agricultural item of interest.

SUMMARY OF THE INVENTION

Preferred embodiments of the present invention relate to an agricultural cutting system and an agricultural cut-point generation method.

A method for generating an agricultural cut-point for an agricultural item according to a preferred embodiment of the present invention includes capturing an image of the agricultural item, generating a depth estimation of the agricultural item, segmenting the image of the agricultural item to generate a segmented image that identifies different segments of the agricultural item, detecting an agricultural feature of the agricultural item based on the image of the agricultural item, generating a two-dimensional cut-point based on the segmented image and the agricultural feature, and generating a three-dimensional cut-point based on the two-dimensional cut-point and the depth estimation of the agricultural item.

In a method according to a preferred embodiment of the present invention, the generating the depth estimation of the agricultural item, the segmenting the image of the agricultural item, and the detecting the agricultural feature are simultaneously performed.

In a method according to a preferred embodiment of the present invention, the capturing the image of the agricultural item includes capturing a plurality of images of the agricultural item from a plurality of viewpoints, and the plurality of images are captured using a camera that is moved to the plurality of viewpoints.

In a method according to a preferred embodiment of the present invention, the generating the depth estimation of the agricultural item includes generating a disparity estimation using an Artificial Intelligence disparity estimation model.

In a method according to a preferred embodiment of the present invention, the method further includes generating a point cloud based on the depth estimation of the agricultural item, and removing one or more points of the point cloud when the one or more points have a depth greater than a depth-based threshold.

In a method according to a preferred embodiment of the present invention, the depth-based threshold is set based on a workable range of a cutting system used to execute a cutting operation at the three-dimensional cut-point.

In a method according to a preferred embodiment of the present invention, the method further includes generating a point cloud based on the depth estimation of the agricultural item, and removing one or more points from the point cloud based on a density of points included in the point cloud.

In a method according to a preferred embodiment of the present invention, the segmented image is generated using an instance segmentation Artificial Intelligence architecture.

In a method according to a preferred embodiment of the present invention, the method further includes training the instance segmentation Artificial Intelligence architecture using a segmentation dataset tailored to an instant segmentation task with respect to the agricultural item, and the segmentation dataset includes a plurality of annotated images of the agricultural item, the plurality of annotated images include masks formed around segments of the agricultural item, and at least one of the plurality of annotated images includes discrete portions of a same segment assigned a same label.

In a method according to a preferred embodiment of the present invention, the method further includes determining agricultural feature locations of a plurality of agricultural features of the agricultural item, including the agricultural feature, using an object detection model that receives the image of the agricultural item and detects the agricultural features within the image of the agricultural item.

In a method according to a preferred embodiment of the present invention, the method further includes determining agricultural feature locations of a plurality of agricultural features of the agricultural item including the agricultural feature, and the generating the two-dimensional cut-point includes associating the plurality of agricultural features to a particular segment of the different segments of the agricultural item based on the agricultural feature locations, assigning each of the plurality of agricultural features an identifier with respect to the particular segment to which the plurality of agricultural features was associated, and generating the two-dimensional cut-point based on the identifiers assigned to the plurality of agricultural features.

In a method according to a preferred embodiment of the present invention, the segmented image includes masks that identify the different segments of the agricultural item, the masks that identify the different segments include a particular mask that identifies the particular segment, and the plurality of agricultural features are associated to the particular segment when the agricultural feature locations of the plurality of agricultural features are within the particular mask or are within a predetermined distance of the particular mask.

In a method according to a preferred embodiment of the present invention, the identifiers are assigned to the plurality of agricultural features based on respective distances between the agricultural feature locations and a point of the particular mask.

In a method according to a preferred embodiment of the present invention, the two-dimensional cut-point is generated at a point between two of the plurality of agricultural features based on the identifiers assigned to the plurality of agricultural features.

In a method according to a preferred embodiment of the present invention, the method further includes moving the two-dimensional cut-point such that the two-dimensional cut-point is located within the particular mask when the two-dimensional cut-point generated at the point between the plurality of agricultural features is not located within the particular mask.

In a method according to a preferred embodiment of the present invention, the method further includes determining an angle of a portion of the particular segment on which the two-dimensional cut-point is generated based on the agricultural feature locations of the two of the plurality of agricultural features, and determining a cut-point angle of the two-dimensional cut-point based on the angle of the portion of the particular segment on which the two-dimensional cut-point is generated.

In a method according to a preferred embodiment of the present invention, the agricultural feature of the agricultural item is detected based on the segmented image.

In a method according to a preferred embodiment of the present invention, the method further includes combining a plurality of three-dimensional cut-points to generate a mega three-dimensional cut-point, and the capturing the image of the agricultural item includes capturing a plurality of images of the agricultural item from a plurality of viewpoints, the generating the depth estimation of the agricultural item includes generating a plurality of depth estimations of the agricultural item that respectively correspond to the plurality of images, the segmenting the image of the agricultural item includes generating a plurality of segmented images that respectively correspond to the plurality of images, the detecting the agricultural feature of the agricultural item includes detecting the agricultural feature of the agricultural item in each of the plurality of images, the generating the two-dimensional cut-point includes generating a plurality of two-dimensional cut-points based on the plurality of segmented images and the agricultural features, the plurality of two-dimensional cut-points respectively correspond to the plurality of viewpoints, and the generating the three-dimensional cut-point includes generating the plurality of three-dimensional cut-points based on the plurality of two-dimensional cut-points and the plurality of depth estimations of the agricultural item, the plurality of three-dimensional cut-points respectively correspond to the plurality of viewpoints.

In a method according to a preferred embodiment of the present invention, the combining the plurality of three-dimensional cut-points to generate the mega three-dimensional cut-point includes assigning a search radius to each of the plurality of three-dimensional cut-points, performing one or more spatial transformations to align the plurality of three-dimensional cut-points, and merging the plurality of three-dimensional cut-points into the mega three-dimensional cut-point when the plurality of three-dimensional cut-points are located within the search radius assigned to one of the plurality of three-dimensional cut-points.

In a method according to a preferred embodiment of the present invention, the method further includes generating a plurality of point clouds based on the plurality of depth estimations of the agricultural item, the plurality of point clouds respectively correspond to the plurality of viewpoints, combining the plurality of point clouds to generate a mega point cloud, merging the mega three-dimensional cut-point and the mega point cloud, tracing a portion of the mega point cloud that corresponds to a segment of the agricultural item on which the mega three-dimensional cut-point is located to determine if an additional mega three-dimensional cut-point is located on the segment of the agricultural item, and removing the additional mega three-dimensional cut-point when the additional mega three-dimensional cut-point is determined to be located on the segment of the agricultural item.

In a method according to a preferred embodiment of the present invention, the method further includes determining if an additional mega three-dimensional cut-point is located on a segment of the agricultural item on which the mega three-dimensional cut-point is located, and removing the additional mega three-dimensional cut-point when the additional mega three-dimensional cut-point is determined to be located on the segment of the agricultural item.

In a method according to a preferred embodiment of the present invention, the method further includes determining a plurality of cut-point angles that correspond to the plurality of two-dimensional cut-points, the plurality of cut-point angles being determined based on angles of portions of particular segments of the agricultural item on which the plurality of two-dimensional cut-points are generated, and determining a mega cut-point angle for the mega three-dimensional cut-point based on the plurality of cut-point angles.

In a method according to a preferred embodiment of the present invention, the generating the depth estimation of the agricultural item includes generating a disparity estimation based on the image of the agricultural item.

In a method according to a preferred embodiment of the present invention, the generating the depth estimation of the agricultural item includes obtaining point cloud data from a LIDAR sensor.

A system for generating an agricultural cut-point for an agricultural item according to a preferred embodiment of the present invention includes a camera to capture an image of the agricultural item, and a processor configured or programmed to segment the image of the agricultural item to generate a segmented image that identifies different segments of the agricultural item, detect an agricultural feature of the agricultural item based on the image of the agricultural item, generate a two-dimensional cut-point based on the segmented image and the agricultural feature, and generate a three-dimensional cut-point based on the two-dimensional cut-point and a depth estimation of the agricultural item.

In a system according to a preferred embodiment of the present invention, the processor is configured or programmed to simultaneously generate the depth estimation of the agricultural item, segment the image of the agricultural item, and detect the agricultural feature.

In a system according to a preferred embodiment of the present invention, the image of the agricultural item includes a plurality of images of the agricultural item from a plurality of viewpoints, and the plurality of images are captured using the camera that is moved to the plurality of viewpoints.

In a system according to a preferred embodiment of the present invention, the processor is configured or programmed to generate a disparity estimation using an Artificial Intelligence disparity estimation model to generate the depth estimation of the agricultural item.

In a system according to a preferred embodiment of the present invention, the processor is configured or programmed to generate a point cloud based on the depth estimation of the agricultural item, and remove one or more points of the point cloud when the one or more points have a depth greater than a depth-based threshold.

In a system according to a preferred embodiment of the present invention, the depth-based threshold is set based on a workable range within which a cutting operation at the three-dimensional cut-point can be executed.

In a system according to a preferred embodiment of the present invention, the processor is configured or programmed to generate a point cloud based on the depth estimation of the agricultural item, and remove one or more points from the point cloud based on a density of points included in the point cloud.

In a system according to a preferred embodiment of the present invention, the processor is configured or programmed to generate the segmented image using an instance segmentation Artificial Intelligence architecture.

In a system according to a preferred embodiment of the present invention, the instance segmentation Artificial Intelligence architecture is trained using a segmentation dataset tailored to an instant segmentation task with respect to the agricultural item, the segmentation dataset includes a plurality of annotated images of the agricultural item, the plurality of annotated images include masks around segments of the agricultural item, and at least one of the plurality of annotated images includes discrete portions of a same segment assigned a same label.

In a system according to a preferred embodiment of the present invention, the processor is configured or programmed to determine agricultural feature locations of a plurality of agricultural features of the agricultural item, including the agricultural feature, based on the image of the agricultural item.

In a system according to a preferred embodiment of the present invention, the processor is configured or programmed to determine agricultural feature locations of a plurality of agricultural features of the agricultural item including the agricultural feature, and, to generate the two-dimensional cut-point, the processor is configured or programmed to associate the plurality of agricultural features to a particular segment of the different segments of the agricultural item based on the agricultural feature locations, assign each of the plurality of agricultural features an identifier with respect to the particular segment to which the plurality of agricultural features was associated, and generate the two-dimensional cut-point based on the identifiers assigned to the plurality of agricultural features.

In a system according to a preferred embodiment of the present invention, the segmented image includes masks that identify the different segments of the agricultural item, the masks that identify the different segments include a particular mask that identifies the particular segment, and the processor is configured or programmed to associate the plurality of agricultural features to the particular segment when the agricultural feature locations of the plurality of agricultural features are within the particular mask or are within a predetermined distance of the particular mask.

In a system according to a preferred embodiment of the present invention, the processor is configured or programmed to assign the identifiers to the plurality of agricultural features based on respective distances between the agricultural feature locations and a point of the particular mask.

In a system according to a preferred embodiment of the present invention, the processor is configured or programmed to generate the two-dimensional cut-point at a point between two of the plurality of agricultural features based on the identifiers assigned to the plurality of agricultural features.

In a system according to a preferred embodiment of the present invention, the processor is configured or programmed to move the two-dimensional cut-point such that the two-dimensional cut-point is located within the particular mask when the two-dimensional cut-point generated at the point between the plurality of agricultural features is not located within the particular mask.

In a system according to a preferred embodiment of the present invention, the processor is configured or programmed to determine an angle of a portion of the particular segment on which the two-dimensional cut-point is generated based on the agricultural feature locations of the two of the plurality of agricultural features, and determine a cut-point angle of the two-dimensional cut-point based on the angle of the portion of the particular segment on which the two-dimensional cut-point is generated.

In a system according to a preferred embodiment of the present invention, the processor is configured or programmed to detect the agricultural feature of the agricultural item based on the segmented image.

In a system according to a preferred embodiment of the present invention, the camera is operable to capture a plurality of images of the agricultural item from a plurality of viewpoints, and the processor is configured or programmed to combine a plurality of three-dimensional cut-points to generate a mega three-dimensional cut-point, generate a plurality of segmented images that respectively correspond to the plurality of images, detect the agricultural feature of the agricultural item in each of the plurality of images, generate a plurality of two-dimensional cut-points based on the plurality of segmented images and the agricultural features, the plurality of two-dimensional cut-points respectively correspond to the plurality of viewpoints, and generate the plurality of three-dimensional cut-points based on the plurality of two-dimensional cut-points and a plurality of depth estimations of the agricultural item that respectively correspond to the plurality of images, the plurality of three-dimensional cut-points respectively correspond to the plurality of viewpoints.

In a system according to a preferred embodiment of the present invention, in order to combine the plurality of three-dimensional cut-points to generate the mega three-dimensional cut-point, the processor is configured or programmed to assign a search radius to each of the plurality of three-dimensional cut-points, perform one or more spatial transformations to align the plurality of three-dimensional cut-points, and merge the plurality of three-dimensional cut-points into the mega three-dimensional cut-point when the plurality of three-dimensional cut-points are located within the search radius assigned to one of the plurality of three-dimensional cut-points.

In a system according to a preferred embodiment of the present invention, the processor is configured or programmed to generate a plurality of point clouds based on the plurality of depth estimations of the agricultural item, the plurality of point clouds respectively correspond to the plurality of viewpoints, combine the plurality of point clouds to generate a mega point cloud, merge the mega three-dimensional cut-point and the mega point cloud, trace a portion of the mega point cloud that corresponds to a segment of the agricultural item on which the mega three-dimensional cut-point is located to determine if an additional mega three-dimensional cut-point is located on the segment of the agricultural item, and remove the additional mega three-dimensional cut-point when the additional mega three-dimensional cut-point is determined to be located on the segment of the agricultural item.

In a system according to a preferred embodiment of the present invention, the processor is configured or programmed to determine if an additional mega three-dimensional cut-point is located on a segment of the agricultural item on which the mega three-dimensional cut-point is located, and remove the additional mega three-dimensional cut-point when the additional mega three-dimensional cut-point is determined to be located on the segment of the agricultural item.

In a system according to a preferred embodiment of the present invention, the processor is configured or programmed to determine a plurality of cut-point angles that correspond to the plurality of two-dimensional cut-points, the plurality of cut-point angles being determined based on angles of portions of particular segments of the agricultural item on which the plurality of two-dimensional cut-points are generated, and determine a mega cut-point angle for the mega three-dimensional cut-point based on the plurality of cut-point angles.

In a system according to a preferred embodiment of the present invention, the processor is configured or programmed to generate a disparity estimation based on the image of the agricultural item to generate the depth estimation of the agricultural item.

In a system according to a preferred embodiment of the present invention, the system includes a LiDAR sensor, and the processor is configured or programmed to generate the depth estimation of the agricultural item based on point cloud data obtained from the LiDAR sensor.

In a system according to a preferred embodiment of the present invention, the system includes a vehicle, a robotic arm supported by the vehicle, a cutting tool attached to the robotic arm, and the camera is supported by the vehicle, and the processor is configured or programmed to control a movement of the robotic arm, to which the cutting tool is attached, based on the three-dimensional cut-point.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 5 shows an example of images captured during an image capture step according to a preferred embodiment of the present invention.

DETAILED DESCRIPTION OF PREFERRED EMBODIMENTS

Figure 1:
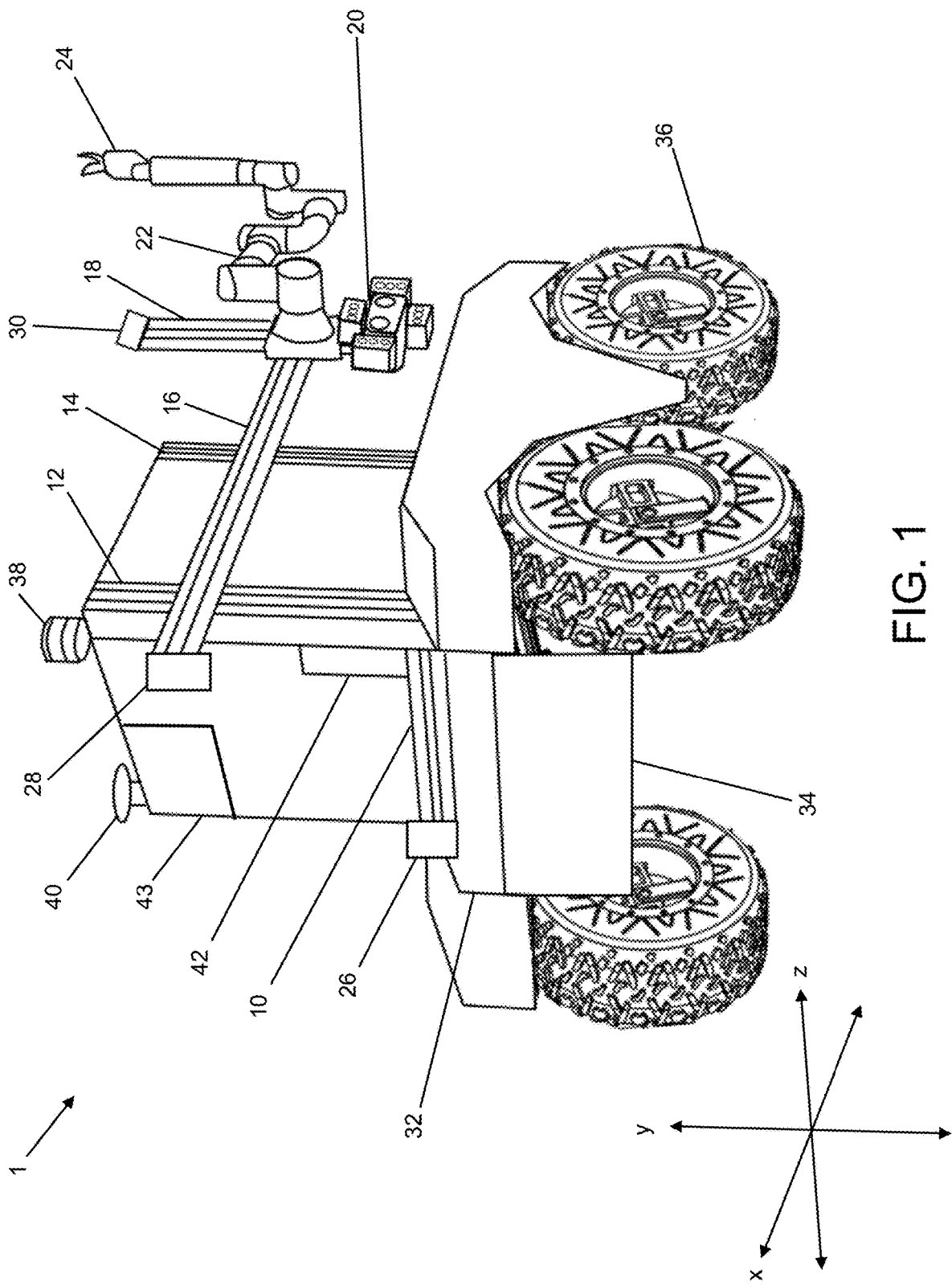
FIG. 1 shows a front perspective view of a cutting system according to a preferred embodiment of the present invention.

FIG. 1 shows a front perspective view of a cutting system 1 according to a preferred embodiment of the present invention. As shown in FIG. 1, the cutting system 1 can include a vehicle or the like. However, the cutting system 1 can be mounted on a cart that is able to be towed by a vehicle or a person, or a self-driving or self-propelled cart or vehicle.

As shown in FIG. 1, the cutting system 1 includes a base frame 10, side frames 12 and 14, a horizontal frame 16, and a vertical frame 18. The side frames 12 and 14 are mounted to the base frame 10, and the side frames 12 and 14 directly support the horizontal frame 16. The vertical frame 18 is mounted on the horizontal frame 16. One or more devices, such as a camera 20, a robotic arm 22, and/or a cutting tool 24, can be mounted on and supported by the vertical frame 18, and/or others of the frames 10, 12, 14, or 16, for example.

The base frame 10 includes a base frame motor 26 that is able to move the side frames 12 and 14 along the base frame 10, such that the one or more devices can be moved in a depth direction (the z-axis shown in FIG. 1). The horizontal frame 16 includes a horizontal frame motor 28 that is able to move the vertical frame 18 along the horizontal frame 16, such that the one or more devices can be moved in a horizontal direction (the x-axis shown in FIG. 1). The vertical frame 18 includes a vertical frame motor 30 that is able to move the one or more devices along the vertical frame 18 in a vertical direction (the y-axis shown in FIG. 1). Each of the base frame motor 26, the horizontal frame motor 28, and the vertical frame motor 30 can be a screw motor, for example. Screw motors can provide a relatively high level of precision to accurately move and locate the one or more devices. However, each of the base frame motor 26, the horizontal frame motor 28, and the vertical frame motor 30 can be any motor that provides a continuous torque greater than or equal to about 0.2 N m, and preferably any motor that provides a continuous torque greater than or equal to about 0.3 N m, for example.

Each of the base frame motor 26, the horizontal frame motor 28, and the vertical frame motor 30 can be designed and/or sized according to an overall weight of the one or more devices. In addition, a coupler for each of the base frame motor 26, the horizontal frame motor 28, and the vertical frame motor 30 can be changed according to a motor shaft diameter and/or a corresponding mounting hole pattern.

Figure 3:
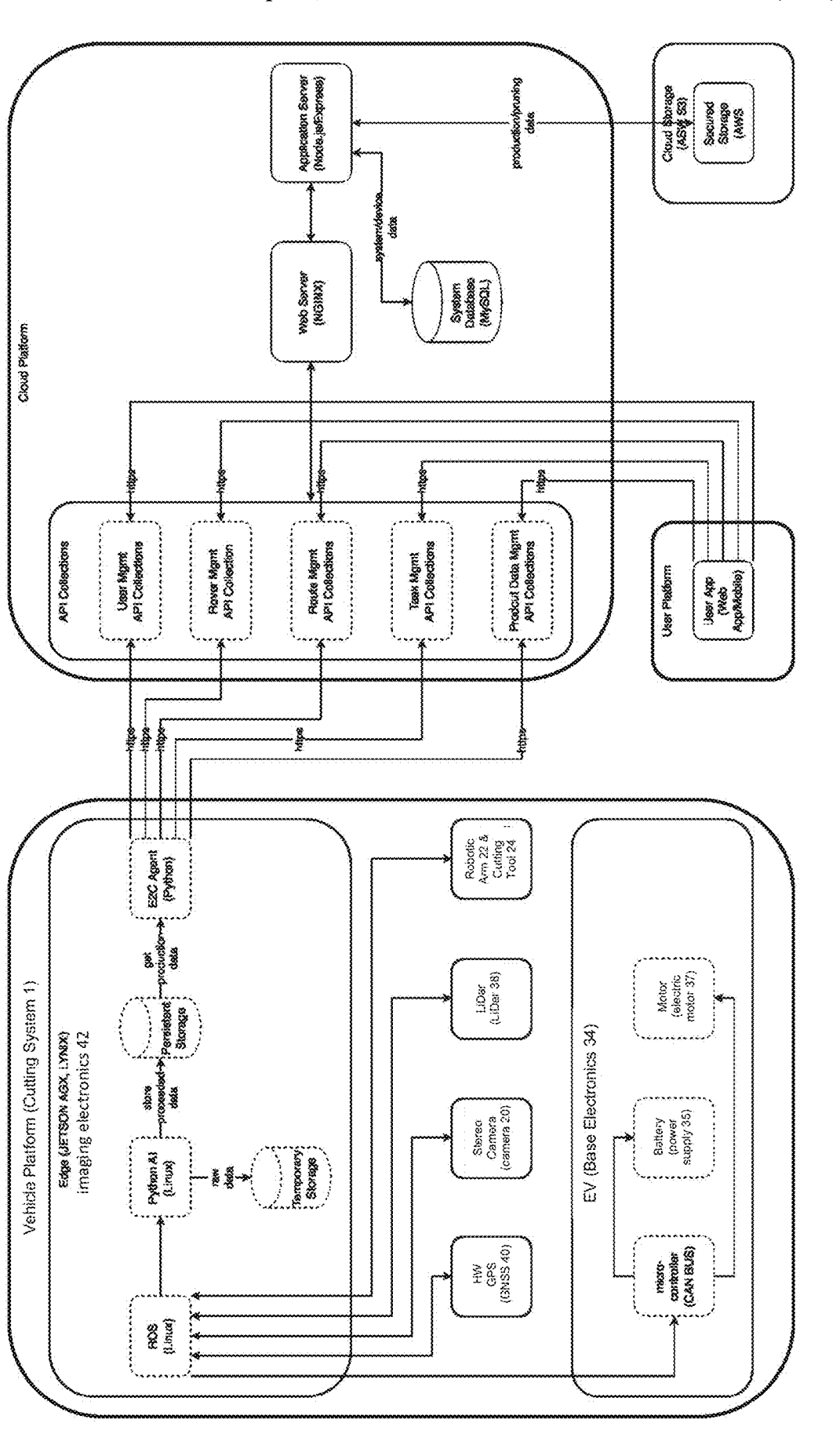
FIG. 3 shows an example of a block diagram of a cloud system that includes a cutting system, a cloud platform, and a user platform according to a preferred embodiment of the present invention.

The base frame 10 can be mounted on a base 32, and base electronics 34 can also be mounted to the base 32. A plurality of wheels 36 can be mounted to the base 32. The plurality of wheels 36 can be controlled by the base electronics 34, and the base electronics 34 can include a power supply 35 to drive an electric motor 37 or the like, as shown in FIG. 3, for example. As an example, the plurality of wheels 36 can be driven by an electric motor 37 with a target capacity of about 65 kW to about 75 KW and a power supply 35 for the electric motor 37 can be a battery with a capacity of about 100 kWh.

The base electronics 34 can also include processor and memory components that are programmed or configured to perform autonomous navigation of the cutting system 1. Furthermore, as shown in FIG. 1, a LiDAR (light detection and ranging) system 38 and a Global Navigation Satellite System (GNSS) 40 can also be mounted to or supported by the base frame 10 or the base 32, and/or others of the frames 10, 12, 14, or 16, for example, so that position data of the cutting system 1 can be determined. The LiDAR system 38 and GNSS 40 can be used for obstacle avoidance and navigation when the cutting system 1 is autonomously moved. Preferably, for example, the cutting system 1 can be implemented with a remote control interface, and can communicate via one or more of Ethernet, USB, wireless communications, and GPS RTK (real time kinematics). The remote control interface and communications devices can be included in one or both of the base electronics 34 and imaging electronics 42 (described below). As shown in FIG. 1, the cutting system 1 can also include, or be communicatively connected with, a display device 43 to display data and/or images obtained by the one or more devices and to display information provided by the base electronics 34 (for example, location, speed, battery life, and the like of the cutting system 100). Alternatively, data and/or images obtained by the one or more devices and provided by the base electronics 34 can be displayed to a user through a user platform.

Figure 2:
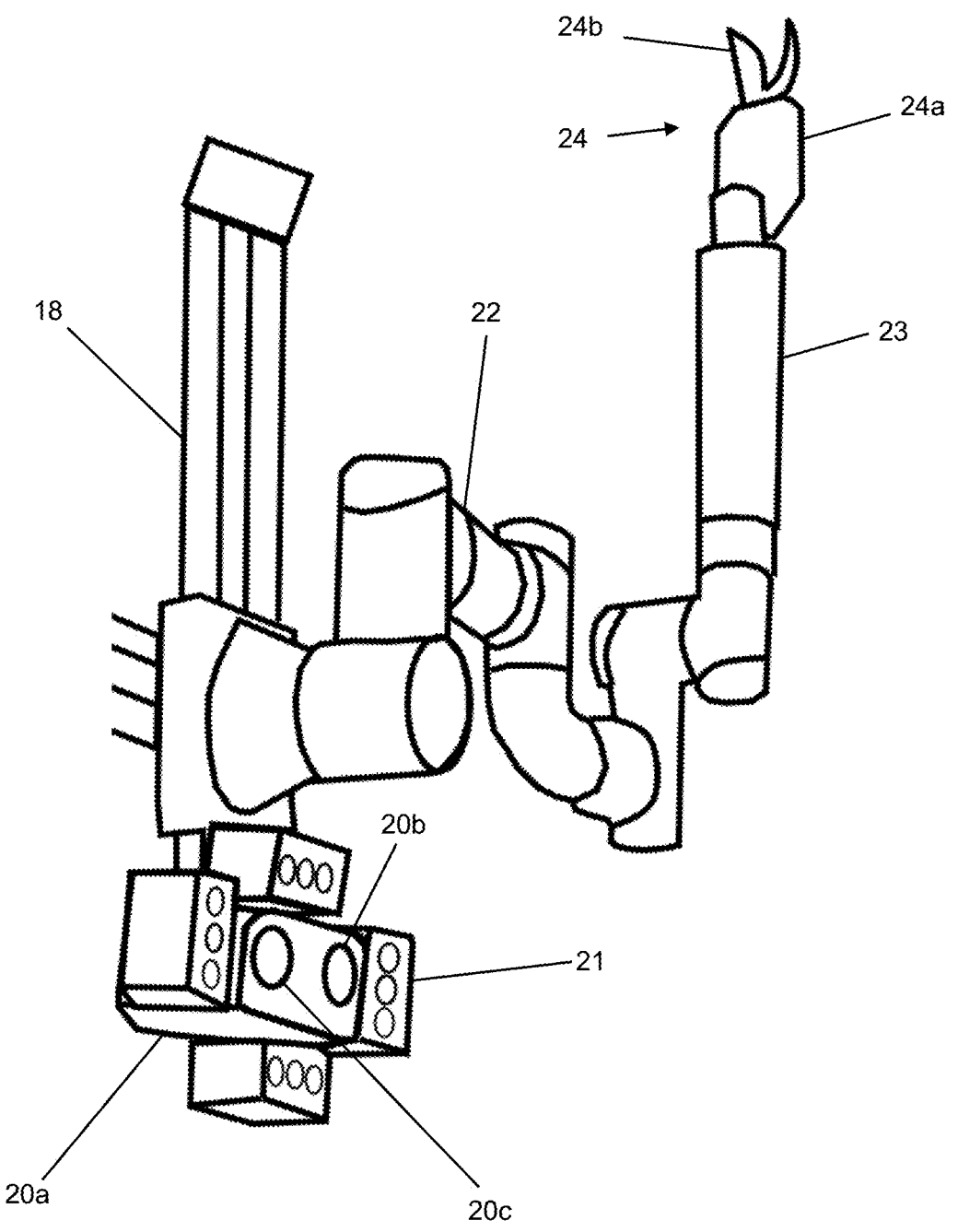
FIG. 2 shows an enlarged view of a portion of a cutting system according to a preferred embodiment of the present invention.

FIG. 2 is a close-up view of a portion of the cutting system 1 that includes the one or more devices. As shown in FIG. 2, the one or more devices can include the camera 20, the robotic arm 22, and the cutting tool 24, which can be mounted to the vertical frame 18, and/or others of the frames 10, 12, 14, or 16, for example. Additional ones of the one or more devices can also be provided on the vertical frame 18, and/or others of the frames 10, 12, 14, or 16, for example.

The camera 20 can include a stereo camera, an RGB camera, and the like. As shown in FIG. 2, the camera 20 can include a main body 20a that includes a first camera/lens 20b (e.g., a left camera/lens) and a second camera/lens 20c (e.g., a right camera/lens). Alternatively, the main body 20a is able to include more than two cameras/lenses. The resolution of the camera 20 can be 1536×2048 pixels or 2448×2048 pixels, for example, but the camera 20 can alternatively have a different resolution. The camera 20 can include, for example, PointGrey CM3-U3-31S4C-CS or PointGrey CM3-U3-50S5C sensors, 3.5 mm f/2.4 or 5 mm f/1.7 lens, and a field of view of 74.2535×90.5344 or 70.4870× 80.3662, however the camera 20 is able to include other sensors and lenses, and have a different field of view.

One or more light sources 21 can be attached to one or more sides of the main body 20a of the camera 20. The light sources 21 can include an LED light source that faces a same direction as the one or more devices such as the camera 20, for example, along the z-axis shown in FIG. 1. The light sources 21 can provide illumination of an object or objects to be imaged by the camera 20. For example, the light sources 21 can operate as a flash during daytime operation to compensate for ambient light when capturing images with the camera 20. During nighttime operation, the light sources 21 can operate as either a flash for the camera 20, or the light sources can provide constant illumination for the camera 20. In a preferred embodiment, the one or more light sources 21 include 100 watt LED modules, for example, but LED modules having a different wattage (e.g., 40 watts or 60 watts) can also be used.

The robotic arm 22 can include a robotic arm known to a person of ordinary skill in the art, such the Universal Robot 3 e-series robotic arm and the Universal Robot 5 e-series robotic arm. The robotic arm 22, also known as an articulated robotic arm, can include a plurality of joints that act as axes that enable a degree of movement, wherein the higher number of rotary joints the robotic arm 22 includes, the more freedom of movement the robotic arm 22 has. For example, the robotic arm 22 can include four to six joints, which provide the same number of axes of rotation for movement.

In a preferred embodiment of the present invention, a controller can be configured or programed to control movement of the robotic arm 22. For example, the controller can be configured or programed to control the movement of the robotic arm 22 to which the cutting tool 24 is attached to position the cutting tool 24 in accordance with the steps discussed below. For example, the controller can be configured or programed to control movement of the robotic arm 22 based on a location of a cut-point located on an agricultural item of interest.

In a preferred embodiment of the present invention, the cutting tool 24 includes a main body 24a and a blade portion 24b, as shown in FIG. 2, for example. The blade portion 24b can include a driven blade that moves with respect to a fixed blade and is actuated to perform a cutting action together with the fixed blade. The cutting tool 24 can include, for example, a cutting device as disclosed in U.S. application Ser. No. 17/961,666 titled "End Effector Including cutting blade and pulley assembly" which is incorporated in its entirety by reference herein.

In a preferred embodiment of the present invention, the cutting tool 24 can be attached to the robotic arm 22 using a robotic arm mount assembly 23. The robotic arm mount assembly 23 can include, for example, a robotic arm mount assembly as disclosed in U.S. application Ser. No. 17/961, 668 titled "Robotic Arm Mount Assembly including Rack and Pinion" which is incorporated in its entirety by reference herein.

The cutting system 1 can include imaging electronics 42 that can be mounted on the side frame 12 or the side frame 14, as shown in FIG. 1, for example. The imaging electronics 42 can supply power to and control each of the base frame motor 26, the horizontal frame motor 28, and the vertical frame motor 30. That is, the imaging electronics 42 can include a power source to supply power to each of the base frame motor 26, the horizontal frame motor 28, and the vertical frame motor 30. In addition, the imaging electronics 42 can include processor and memory components that are programmed or configured to control each of the base frame motor 26, the horizontal frame motor 28, and the vertical frame motor 30. The processor and memory components of the imaging electronics 42 can also be configured or programmed to control the one or more devices, including the camera 20, the robotic arm 22, the robotic arm mount assembly 23, and the cutting tool 24. In addition, the processor and memory components of the imaging electronics 42 can be configured or programmed to process image data obtained by the camera 20.

As described above, the imaging electronics 42 and the base electronics 34 can include processors and memory components. The processors may be hardware processors, multipurpose processors, microprocessors, special purpose processors, digital signal processors (DPSs), and/or other types of processing components configured or programmed to process data. The memory components may include one or more of volatile, non-volatile, and/or replaceable data store components. For example, the memory components may include magnetic, optical, and/or flash storage components that may be integrated in whole or in part with the processors. The memory components may store instructions and/or instruction sets or programs that are able to be read and/or executed by the processors.

According to another preferred embodiment of the present invention, the imaging electronics 42 can be partially or completely implemented by the base electronics 34. For example, each of the base frame motor 26, the horizontal frame motor 28, and the vertical frame motor 30 can receive power from and/or be controlled by the base electronics 34 instead of the imaging electronics 42.

According to further preferred embodiments of the present invention, the imaging electronics 42 can be connected to a power supply or power supplies that are separate from the base electronics 34. For example, a power supply can be included in one or both of the imaging electronics 42 and the base electronics 34. In addition, the base frame 10 may be detachably attached to the base 32, such that the base frame 10, the side frames 12 and 14, the horizontal frame 16, the vertical frame 18, and the components mounted thereto can be mounted on another vehicle or the like.

The base frame motor 26, the horizontal frame motor 28, and the vertical frame motor 30 are able to move the one or more devices in three separate directions or along three separate axes. However, according to another preferred embodiment of the present invention, only a portion of the one or more devices such as the camera 20, the robotic arm 22, and the cutting tool 24, can be moved by the base frame motor 26, the horizontal frame motor 28, and the vertical frame motor 30. For example, the base frame motor 26, the horizontal frame motor 28, and the vertical frame motor 30 may move only the camera 20. Furthermore, the cutting system 1 can be configured to linearly move the camera 20 along only a single axis while the camera captures a plurality of images, as discussed below. For example, the horizontal frame motor 28 can be configured to linearly move the camera 20 across an agricultural item of interest, such as a grape vine, and the camera 20 can capture a plurality of images of the grape vine.

The imaging electronics 42 and the base electronics 32 of the cutting system 1 can each be partially or completely implemented by edge computing to provide a vehicle platform, for example, by an NVIDIA® JETSON™ AGX computer. In a preferred embodiment of the present invention, the edge computing provides all of the computation and communication needs of the cutting system 1. FIG. 3 shows an example of a block diagram of a cloud system that includes the vehicle platform and interactions with a cloud platform and a user platform. As shown in FIG. 3, the edge computing of the vehicle platform includes a cloud agent, which is a service-based component that facilitates communication between the vehicle platform and the cloud platform. For example, the cloud agent can receive command and instruction data from the cloud platform (e.g., a web application on the cloud platform), and then transfer the command and instruction data to corresponding components of the vehicle platform. As another example, the cloud agent can transmit operation data and production data to the cloud platform. Preferably, the cloud platform can include software components and data storage to maintain overall operation of the cloud system. The cloud platform preferably provides enterprise-level services with on-demand capacity, fault tolerance, and high availability (for example, AMAZON WEB SERVICES™). The cloud platform includes one or more application programming interfaces (APIs) to communicate with the vehicle platform and with the user platform. Preferably, the APIs are protected with a high level of security and a capacity of each of the APIs can be automatically adjusted to meet computational loads. The user platform provides a dashboard to control the cloud system and to receive data obtained by the vehicle platform and the cloud platform. The dashboard can be implemented by a web-based (e.g., internet browser) application, a mobile application, a desktop application, and the like.

As an example, the edge computing of the vehicle platform shown in FIG. 3 can obtain data from a HW (hardware) GPS (Global Positioning System) (for example, GNSS 40) and LiDAR data (for example, from LiDAR system 38). In addition, the vehicle platform can obtain data from the camera 20. The edge computing of the vehicle platform can include a temporary storage, for example, to store raw data obtained by the camera 20. The edge computing of the vehicle platform can also include a persistent storage, for example, to store processed data. As a specific example, camera data stored in the temporary storage can be processed by an artificial intelligence (AI) model, the camera data can then be stored in the persistent storage, and the cloud agent can retrieve and transmit the camera data from the persistent storage.

Figure 4:
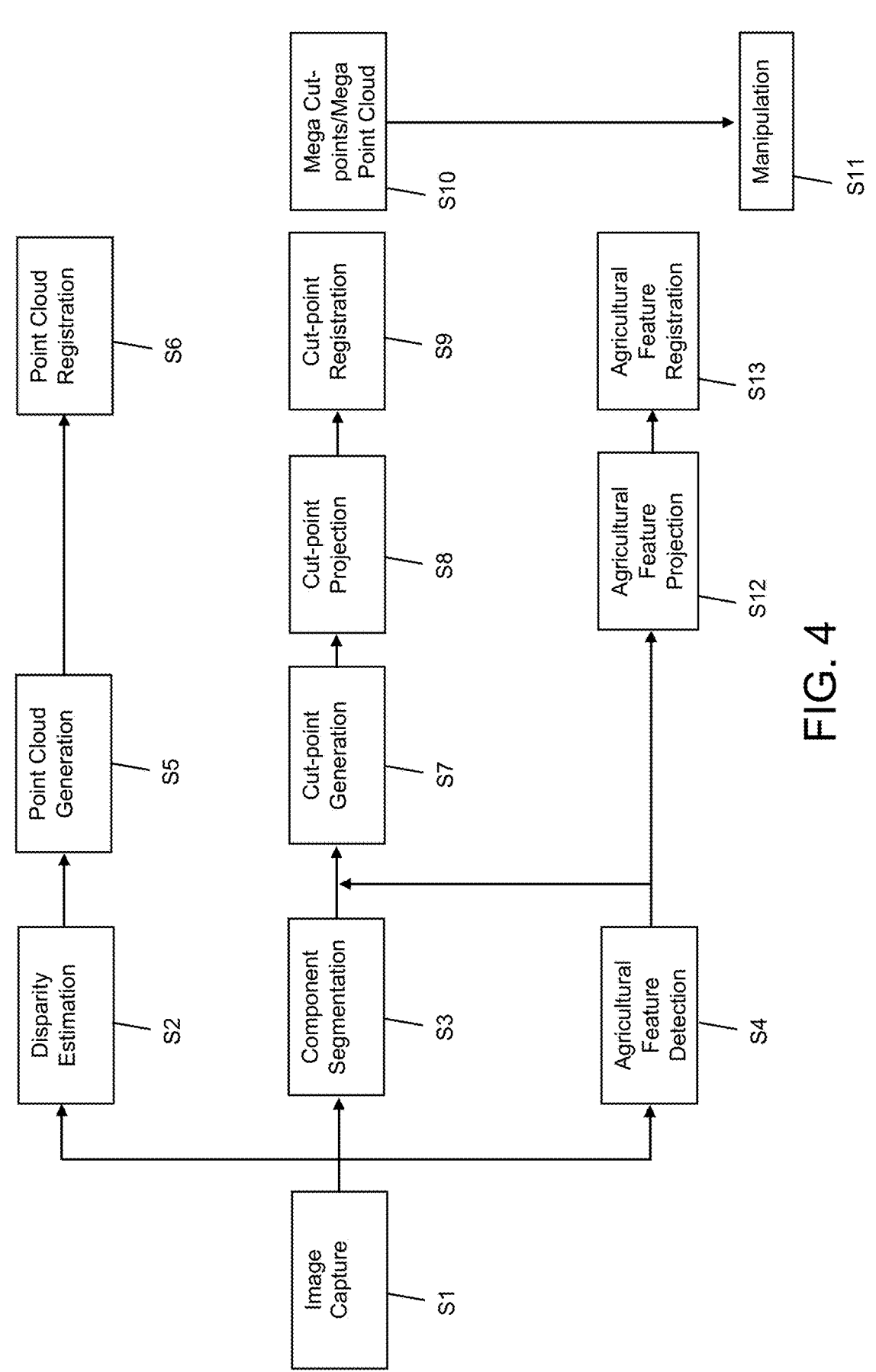
FIG. 4 is a flowchart showing a cut-point generation process according to a preferred embodiment of the present invention.

FIG. 4 is a flowchart showing a cut-point generation process according to a preferred embodiment of the present invention. The cut-point generation process shown in FIG. 4 includes a plurality of steps including an image capture step S1, a disparity estimation step S2, a component segmentation step S3, an agricultural feature detection step S4, a point cloud generation step S5, a point cloud registration step S6, a cut-point generation step S7, a cut-point projection step S8, a cut-point registration step S9, a mega registration step S10, a manipulation step S11, an agricultural feature projection step S12, and an agricultural feature registration step S13, which will be discussed in more detail below.

In a preferred embodiment of the present invention, the disparity estimation step S2, the component segmentation step S3, and the agricultural feature detection step S4 can be performed simultaneously. Alternatively, one or more of the disparity estimation step S2, the component segmentation step S3, and the agricultural feature detection step S4 can be performed individually or in series.

In a preferred embodiment of the present invention, the image capture step S1 includes the cutting system 1 moving to a waypoint located in front of an agricultural item of interest (e.g., a grape vine). The waypoint may be set or programmed in advanced into an on-board memory of the cutting system 1, retrieved from a remote storage, determined according to a distance or time from a previous waypoint, or the like. Upon reaching the waypoint located in front of the agricultural item of interest, the cutting system 1 is stopped, and the camera 20 is used to capture a plurality of images of the agricultural item of interest.

In a preferred embodiment of the present invention, the image capture step S1 includes using the camera 20 to capture a plurality of images of the agricultural item of interest from a plurality of viewpoints (e.g., a plurality of locations of the camera 20). For example, at each viewpoint, the camera 20 is controlled to capture a first image (e.g., a left image) using the first lens 20a, and a second image (e.g., a right image) using the second lens 20b. The plurality of viewpoints (locations of the camera 20) can be reached by controlling the horizontal frame motor 28 to move the camera 20 in the horizontal direction (along the x-axis in FIG. 1) to a plurality of locations in front of the agricultural item of interest. The number of viewpoints can be determined based on a field of view of the camera 20 and how many viewpoints are needed to capture images of the entire agricultural item of interest. In a preferred embodiment, the plurality of images captured by the camera 20 are stored in a local storage of the cutting system 1.

FIG. 5 shows an example of the plurality of images captured during the image capture step S1. For example, from viewpoint 0, a first image (image L0) is captured using the first lens 20a, and a second image (image R0) is captured using the second lens 20b. After the image L0 and the image R0 are captured from viewpoint 0, the camera 20 is moved to viewpoint 1. From viewpoint 1, a first image (image L1) is captured using the first lens 20a, and a second image (image R1) is captured using the second lens 20b. Similarly, a first image (image L2) and a second image (image R2) are captured from viewpoint 2, a first image (image L3) and a second image (image R3) are captured from viewpoint 3, a first image (image L4) and a second image (image R4) are captured from viewpoint 4, a first image (image L5) and a second image (image R5) are captured from viewpoint 5, and a first image (image L6) and a second image (image R6) are captured from viewpoint 6. In the example shown in FIG. 5, the camera 20 is moved in a left-to-right direction to reach the viewpoints 0-6, however the camera 20 could alternatively be moved in a right-to-left direction to reach the viewpoints 0-6.

In a preferred embodiment of the present invention, the image capture step S1 can include down sampling the images captured by the camera 20, for example, by a factor of two. The image capture step S1 can also include rectifying each pair of stereo images (e.g., image L0 and image R0) captured using the first lens 20a and the second lens 20b, which includes the process of reprojecting the image planes (left image plane and right image plane) onto a common plane parallel to the line between the camera lenses.

Once the images of the agricultural item of interest are captured in the image capture step S1, the disparity estimation step S2 can be performed. According to a preferred embodiment of the present invention, the disparity estimation step S2 is an example of a depth estimation step in which a depth estimation of the agricultural item is generated. The disparity estimation step S2 includes using a disparity estimation model to estimate a depth of pixels included in the plurality of images captured in the image capture step S1. In a preferred embodiment, the disparity estimation model generates disparity maps 46 that correspond to the images captured from the viewpoints 0-6 in the image capture step S1. The disparity estimation step S2 can be performed using a plurality of approaches including an Artificial Intelligence (AI) Deep Learning approach or a Classic Computer Vision approach, as discussed in more detail below.

Figure 6:
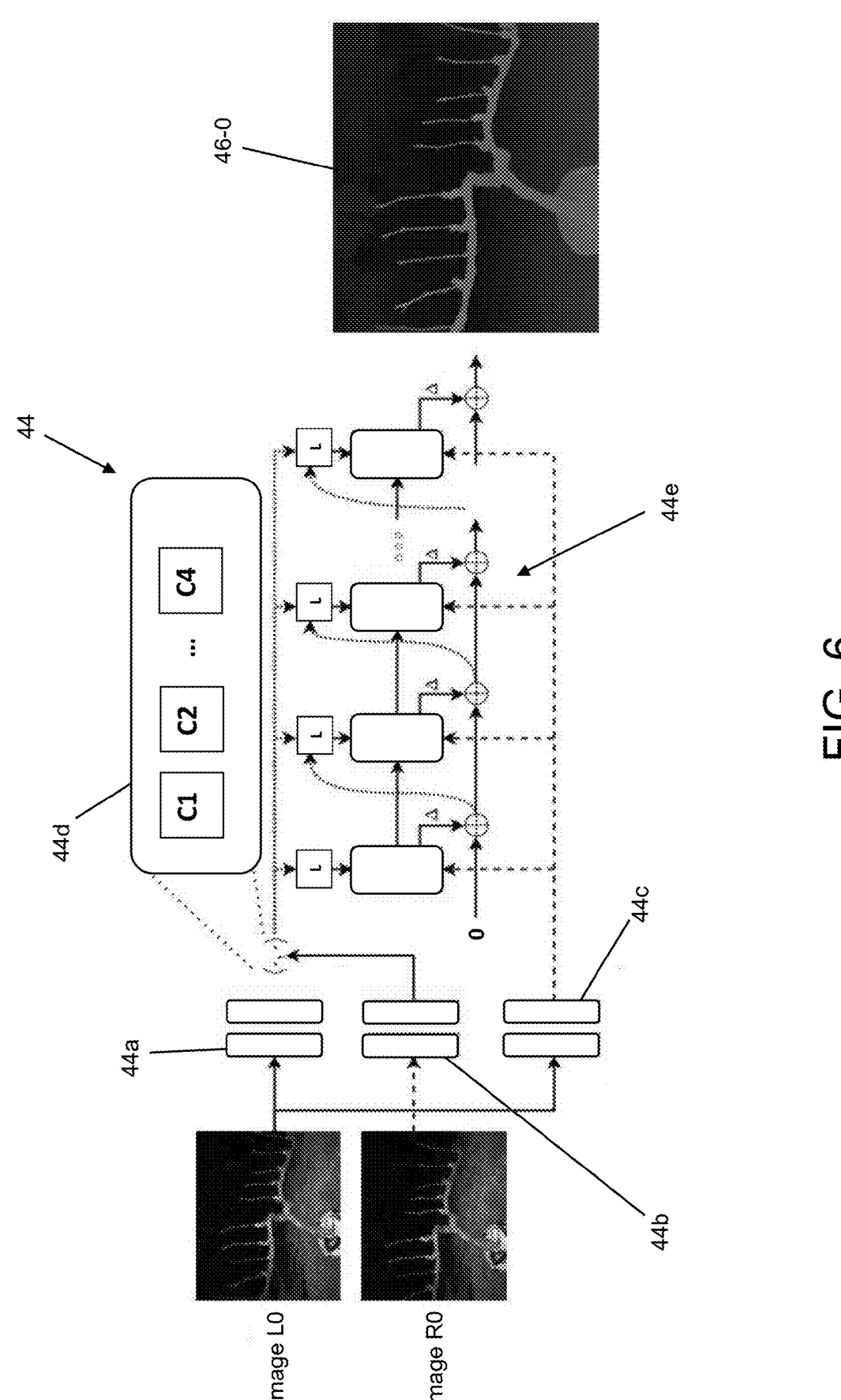
FIG. 6 is a flowchart that shows an example of a disparity estimation step according to a preferred embodiment of the present invention.

FIG. 6 is a flowchart that shows an example of the disparity estimation step S2 performed using an AI Deep Learning approach. FIG. 6 shows an AI disparity estimation model 44 used to generate a disparity map 46-0 that corresponds to viewpoint 0 shown in FIG. 5. The inputs to the AI disparity estimation model 44 include a rectified stereo image pair including the first image (image L0) and the second image (image R0), which were each captured from viewpoint 0 during the image capture step S1. The output of the AI disparity estimation model 44 includes the disparity map 46-0 that corresponds to viewpoint 0.

The AI disparity estimation model 44 can be used to generate disparity maps 46 that correspond to each of the viewpoints 0-6. For example, a rectified stereo image pair including the first image (image L1) and the second image (image R1), which were each captured at viewpoint 1 during the image capture step S1, can be used to generate a disparity map 46-1 that corresponds to viewpoint 1, and a rectified stereo image pair including the first image (image L2) and the second image (image R2), which were each captured at viewpoint 2 during the image capture step S1, can be used to generate a disparity map 46-2 that corresponds to viewpoint 2. Disparity maps 46-3 through 46-6 that correspond to viewpoints 3-6 can be generated using the images captured at the respective viewpoints 3-6.

In a preferred embodiment of the present invention, the AI disparity estimation model 44 matches each pixel in a first image (e.g., image L0) with its corresponding pixel in a second image (e.g., image R0) based on correspondence, which aims at determining that the pair of pixels in the first image and the second image are projections of the same physical point in space. Then, the AI disparity estimation model 44 computes the distance between each pair of matching pixels, for example. In a preferred embodiment of the present invention, the AI disparity estimation model 44 generates the disparity map 46 based on a depth being inversely proportional to a disparity, e.g., the higher the disparity, the closer the object in the image. In a preferred embodiment, the disparity map 46 includes a pixel difference which is mapped to a real-world depth, for example, based on configurations of the camera 20 including the intrinsic and extrinsic parameters of the camera 20.

FIG. 6 shows an example in which the disparity estimation model 44 includes an AI (Deep Learning) framework, for example, a stereomatching AI framework such as a RAFT-Stereo architecture. The RAFT-Stereo architecture is based on an optical flow and uses a recurring neural network approach. The RAFT-Stereo architecture can include feature encoders 44a and 44b, a context encoder 44c, a correlation pyramid 44d, and a disparity estimator component/gated recurrent unit (GRU) 44e, for example. The feature encoder 44a is applied to the first image (e.g., image L0), and the feature encoder 44b is applied to the second image (e.g., image R0). The feature encoders 44a and 44b map each of the first image and the second image to a dense feature map, which is used to construct a correlation volume. The feature encoders 44a and 44b determine the individual features of the first image and the second image including density, texture, and pixel intensity.

In a preferred embodiment of the present invention, the context encoder 44c is applied only to the first image (e.g., image L0). The context features generated by the context encoder 44c are used to initialize a hidden state of an update operator and are also injected into the GRU 44e during each iteration of the update operator. The correlation pyramid 44d constructs a three-dimensional correlation volume using the feature maps generated by the feature encoders 44a and 44b. In a preferred embodiment, the disparity estimator component/gated recurrent unit (GRU) 44e estimates the disparity of each pixel in the image. For example, the GRU 44e predicts a series of disparity fields from an initial starting point using a current estimate of disparity in every iteration. During each iteration, the current estimate of disparity is used to index the correlation volume, producing a set of correlation features. The correlation, disparity, and context features are then concatenated and injected into the GRU 44e. The GRU 44e updates the hidden state, and the updated hidden state is used to predict the disparity updates.

In a preferred embodiment of the present invention, an AI Deep Learning framework/approach other than the RAFT-Stereo architecture can be used to perform the disparity estimation step S2 to generate the disparity maps 46 that correspond to the viewpoints (e.g., viewpoints 0-6). For example, AI Deep Learning approaches such as EdgeStereo, HSM-Net, LEAStereo, MC-CNN, LocalExp, CRLE, HIT- Net, NOSS-ROB, HD3, gwcnet, PSMNet, GANet, DSMNet can be used to perform the disparity estimation step S2 to generate the disparity maps 46. The neural networks of the AI approaches discussed above, including the RAFT-Stereo architecture, can be trained with a synthetic dataset, which are artificially generated/synthesized.

The disparity estimation step S2 can alternatively be performed using a Classic Computer Vision approach. The Classic Computer Vision approach can include a Stereo Semi Global Block Matching (SGMB) function 48 which is an intensity-based approach that generates a dense disparity map 46 for three-dimensional reconstruction. More specifically, the SGMB function 48 is a geometrical approach algorithm that uses the intrinsic and extrinsic parameters of a camera (e.g., camera 20) used to capture the images based on which the disparity map 46 is generated.

Figure 7:
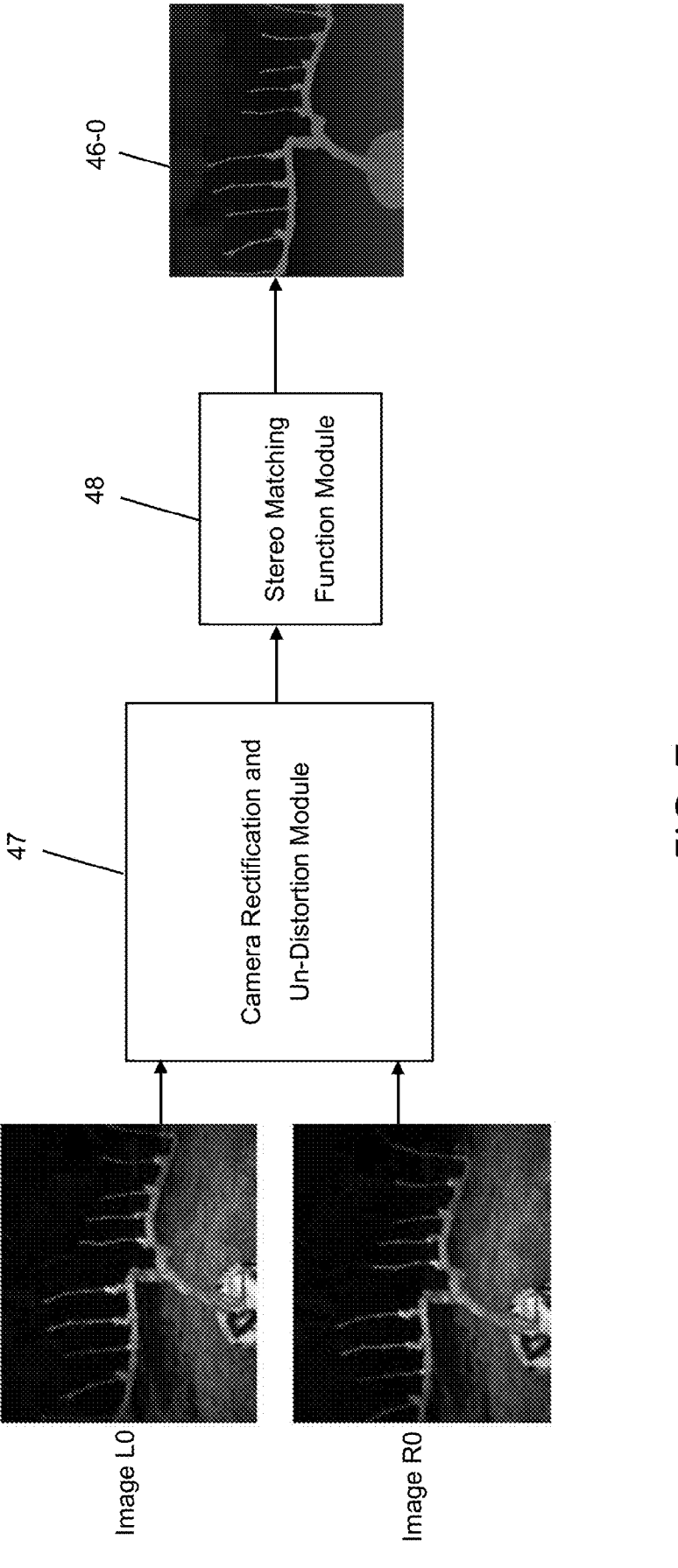
FIG. 7 is a flowchart that shows another example of a disparity estimation step according to a preferred embodiment of the present invention.

FIG. 7 is a flowchart that shows an example of the disparity estimation step S2 being performed using a Classic Computer Vision approach. In FIG. 7, the SGMB function 48 is used to generate a disparity map 46-0 that corresponds to viewpoint 0 shown in FIG. 5, for example. The inputs to the SGMB function 48 include a rectified stereo image pair including a first image (e.g., image L0) and a second image (e.g., image R0), which were captured from viewpoint 0 during the image capture step S1. The output of the SGMB function 48 includes a disparity map 46-0 that corresponds to viewpoint 0. The SGMB function 48 can be used to generate disparity maps 46 that corresponds to viewpoints 0-6.

In a preferred embodiment of the present invention, the first image (e.g., image L0) and the second image (e.g., image R0) are input to a camera rectification and un-distortion module 47 before the SGMB function 48, as shown in FIG. 7, for example. The camera rectification and un-distortion module 47 performs a camera rectification step and an un-distortion step before the SGMB function 48 is used to produce the disparity map 46. In the camera rectification step, a transformation process is performed to project the first image and the second image onto a common plane. In the image un-distortion step, a mapping process is performed to map the coordinates of the output undistorted image to the input camera image using distortion coefficients. After the camera rectification and un-distortion module 47 performs the camera rectification step and the un-distortion step, the camera rectification and un-distortion module 47 outputs the rectified and undistorted image pair to the SGMB function 48.

In a preferred embodiment of the present invention, parameters of the SGMB function 48 such as window size, minimum disparity, or maximum disparity can be fine-tuned depending on factors including the image size, illumination conditions, and camera mount angles of the camera 20 to optimize disparity. A parameter of the uniqueness ratio can also be fine-tuned to filter out noise. Parameters of the SGMB function 48 can also include speckle window size and speckle range which are post processing parameters used to avoid speckle artifacts, and which can also be fined-tuned based on operating conditions including illumination conditions and camera mount angles of the camera 20.

In a preferred embodiment of the present invention, the point cloud generation step S5 includes generating point clouds 49 that correspond to the viewpoints from which images were captured in the image capture step S1. For example, the point cloud generation step S5 includes generating point clouds 49-0 through 49-6 that correspond to the viewpoints 0-6 shown in FIG. 5. Each of the point clouds 49-0 through 49-6 is a set of data points in space, wherein each point has a position which is represented as a set of real-world cartesian coordinates (x, y, and z points).

Figure 8A:
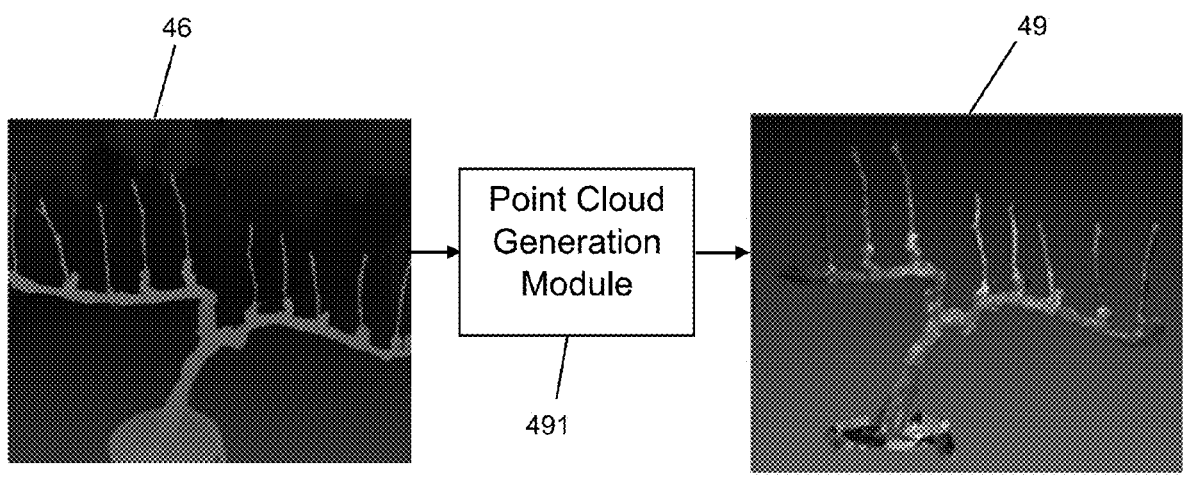
FIG. 8A illustrates a point cloud generation step according to a preferred embodiment of the present invention.

As shown in FIG. 8A, for example, a disparity map 46 generated during the disparity estimation step S2 can be reprojected to three-dimensional data points by a point cloud generation module 491 in order to form the point cloud 49 generated in the point cloud generation step S5. The point cloud generation step S5 includes the process of converting the two-dimensional disparity (depth) map 46 into a point set (X, Y, Z coordinates) of a point cloud 49. In a preferred embodiment, the point cloud generation module 491 can convert the disparity (depth) map 46 to the three-dimensional points of the point cloud 49 using the camera parameters of the camera 20. For example, to convert the disparity (depth) map 46 to the three-dimensional points, the formula Z=fB/d can be used wherein f is the focal length (in pixels), B is the baseline (in meters), and d is the disparity (depth) map 46. After Z is determined, X and Y can be calculated using the camera projection equations (1) X=uZ/f and (2) Y=vZ/f, wherein u, v are pixel locations in the two-dimensional image space, X is the real-world x position (x-axis), Y is the real-world y position (y-axis), and Z is the real-world z position (z-axis).

In a preferred embodiment, built-in API functions can be used to convert a disparity map 46 into the three-dimensional points used to generate the point cloud 49 using a reverse projection matrix obtained using the intrinsic and extrinsic parameters of the camera 20. For example, the values of X (the real-world x position), Y (the real-world y position), and Z (the real-world z position) can be determined based on the following matrix.

$$\begin{bmatrix} X \\ Y \\ Z \\ W \end{bmatrix} = Q \begin{bmatrix} x \\ y \\ \text{disparity}(x, y) \\ z \end{bmatrix}$$

In the above matrix, X is the real-world x position (x-axis), Y is the real-world y position (y-axis), and Z is the real-world z position (z-axis). Variable x and variable y are the values that correspond to the coordinates in a calibrated two-dimensional left or right image (e.g., image L0 or image R0) captured during the image capture step S1, and the variable z=1. The disparity (x, y) is the disparity value determined from the disparity map 46. For example, the disparity map 46 can be a single-channel 8-bit unsigned, 16-bit signed, 32-bit signed or 32-bit floating-point disparity image. The variable Q can be a 4×4 perspective transformation matrix that is a disparity-to-depth mapping matrix that can be obtained based on variables including a first camera (e.g., first camera 20b) intrinsic matrix, first camera distortion parameters, a second camera (e.g., second camera 20c) intrinsic matrix, second camera distortion parameters, a size of an image used for stereo calibration, a rotation matrix from the coordinate system of the first camera to the second camera, and a translation vector from the coordinate system of the first camera to the second camera, with a program such as stereoRectify. For example, the variable Q can be represented by the following matrix wherein $c_{x1}$ is a distance (pixels) in a rectified two-dimensional image (e.g., rectified image L0) from a left edge of the rectified two-dimensional image to a point at which the optic axis (e.g., the axis between the center of the first camera/lens 20b and the physical object) intersects the image plane of the rectified two-dimensional image, $c_{x2}$ is a distance (pixels) in a rectified two-dimensional image (e.g., rectified image R0) from a left edge of the rectified two-dimensional image to a point at which the optic axis (e.g., the axis between the center of the second camera/lens 20c and the physical object) intersects the image plane of the rectified two-dimensional image, Cy is a distance (pixels) in a rectified two-dimensional image (e.g., rectified image L0) from a top edge of the rectified two-dimensional image to a point at which the optic axis (e.g., the axis between the center of the first camera/lens 20b or the second camera/lens 20c and the physical object) intersects the image plane of the rectified two-dimensional image, f is the focal length (in pixels), and $T_x$ is a distance between the first camera 20b and the second camera 20c.

$$Q = \begin{bmatrix} 1 & 0 & 0 & -c_{x1} \\ 0 & 1 & 0 & -c_y \\ 0 & 0 & 0 & f \\ 0 & 0 & -\dfrac{1}{T_x} & \dfrac{c_{x1} - c_{x2}}{T_x} \end{bmatrix}$$

Accordingly, variable W can be represented by the following equation below. Variable W can be used to transform the values for X (the real-world x position), Y (the real-world y position), and Z (the real-world z position) from pixels to a unit of distance (e.g., millimeters).

$$W = \frac{\text{disparity}(x, y)}{T_x} + \frac{c_{x1} - c_{x2}}{T_x}$$

The point cloud generation step S5 can include generating point clouds 49-0 through 49-6 that correspond to each of viewpoints 0-6 shown in FIG. 5. For example, the point cloud 49-0 can be generated based on the disparity map 46-0 that corresponds to viewpoint 0, the point cloud 49-1 can be generated based on the disparity map 46-1 that corresponds to viewpoint 1, the point cloud 49-2 can be generated based on the disparity map 46-2 that corresponds to viewpoint 2, and similarly, the point clouds 49-3 through 49-6 can be generated based on the disparity maps 46-3 through 46-6 that respectively correspond to viewpoints 3-6.

Figure 8B:
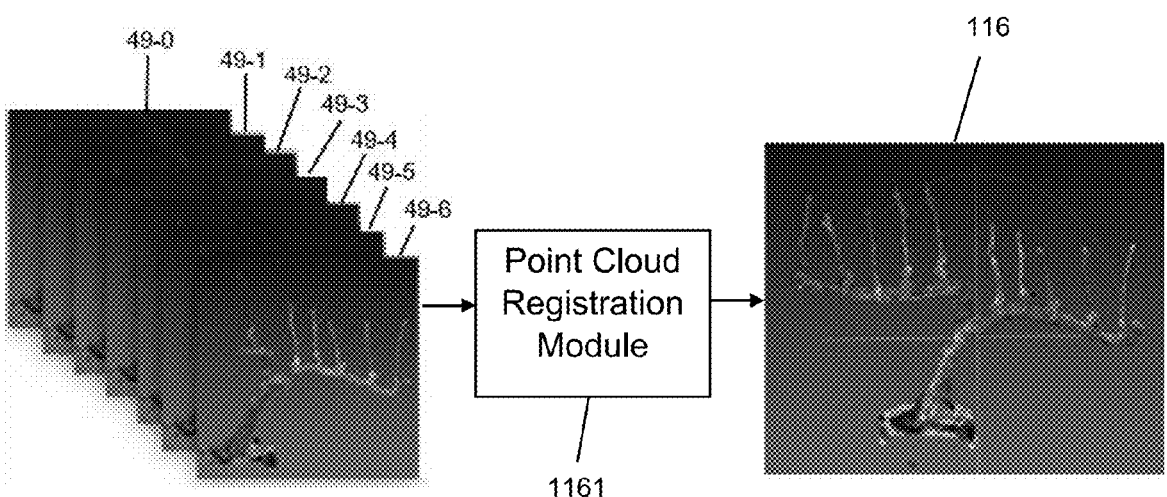
FIG. 8B illustrates a point cloud registration step according to a preferred embodiment of the present invention.

In a preferred embodiment of the present invention, the point cloud registration step S6 includes determining one or more spatial transformations (e.g., scaling, rotation, and/or translation) that combine/align the point clouds (e.g., point clouds 49-0 through 49-6) generated in the point cloud generation step S5. More specifically, a point cloud registration module 1161 is used to align the point clouds 49 generated in the point cloud generation step S5 to generate a mega point cloud 116, as shown in FIG. 8B, for example.

In a preferred embodiment, the point cloud registration step S6 can be performed based on one or more assumptions including that the horizontal frame 16 is exactly horizontal and not disoriented, and that the physical distance between each of the viewpoints (e.g., viewpoints 0-6) is a predetermined value such as about 15 cm or about 20 cm, for example. Based on such one or more assumptions, it may be necessary only to perform translation along the X-axis (axis of the horizontal frame 16) in-order to obtain the mega point cloud 116. In a preferred embodiment, to transform an individual point cloud 49 from one viewpoint to an individual point cloud 49 from another viewpoint, a 4×4 transformation matrix in which each element of the transformation matrix represents translation and rotation information can be used. For example, the 4×4 transformation matrix can be used to sequentially transform each of the point clouds (e.g., point clouds 49-0 through 49-6) generated during the point cloud generation step S5 in order to generate the mega point cloud 116 in the point cloud registration step S6.

In a preferred embodiment of the present invention, a depth-based thresholding step can be performed after the point cloud generation step S5. The depth-based thresholding step includes removing points from a point cloud 49 that have a depth greater than a set depth-based threshold. The depth-based threshold is a depth value (a value in the z-direction shown in FIG. 1) that can be set, for example, by a user. For example, the depth-based threshold can be set based on a length of the robot arm 22 or the workable space of the robotic arm 22. For example, the depth-based threshold can be set to a value of 1.5 meters if the length of the robotic arm is 1.5 meters or the workable space of the robotic arm extends 1.5 meters in the depth direction (the z-direction in FIG. 1). In other words, the depth-based threshold can be set based on a workable range of the cutting system 1 in the depth direction.

Figures 9A, 9B:
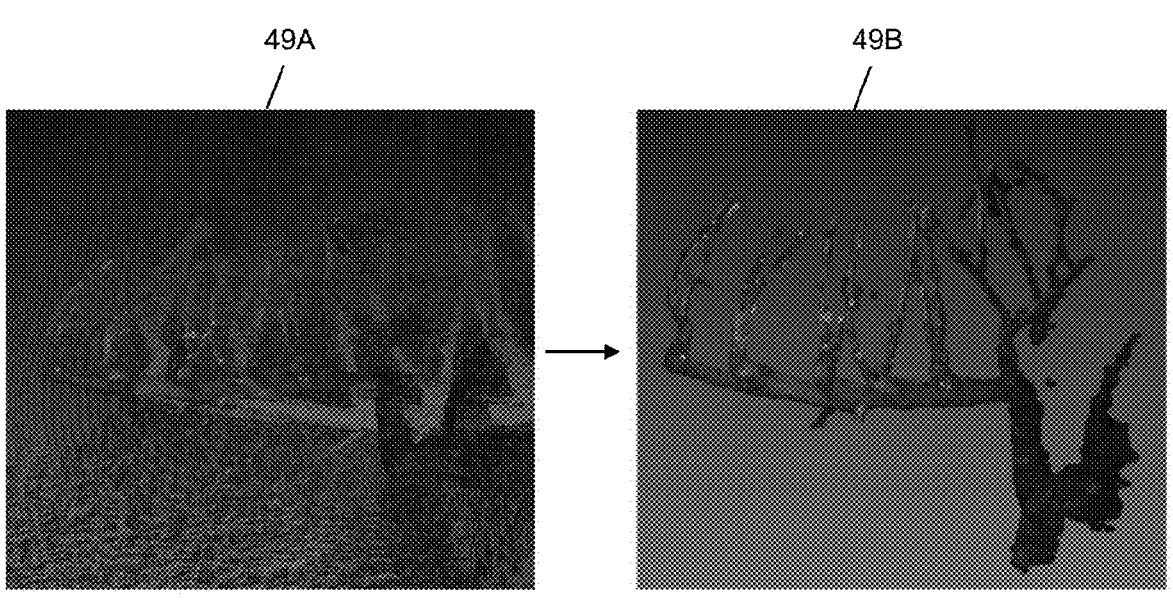
FIG. 9A shows an example of a depth-based thresholding process according to a preferred embodiment of the present invention.
FIG. 9B shows an example of an outlier removal process according to a preferred embodiment of the present invention.

Each point cloud 49 generated during the point cloud generation step S5 is generated using a disparity map 46 that includes both a foreground and a background since the disparity map 46 is generated using the images captured during the image capture step S1. For example, the agricultural item of interest (e.g., the grape vine) is included in the foreground of the disparity map 46 and the background of the disparity map 46 is not of interest. The depth-based thresholding step is able to remove points of the point cloud 49 that correspond to the background of the disparity map 46. FIG. 9A shows an example of a point cloud 49A before the depth-based thresholding step and the same point cloud 49B after the depth-based thresholding step. The depth-based thresholding step is able to reduce the number of points included in the point cloud 49, which reduces computation time and memory requirements that are affected by the number of points included in the point cloud 49.

In a preferred embodiment of the present invention, a statistical outlier removal step can be performed after the point cloud generation step S5. The statistical outlier removal step can be performed after the depth-based thresholding step, or alternatively, before or concurrently with the depth-based thresholding step. The statistical outlier removal step includes a process of removing trailing points and dense points, produced during the disparity estimation step S2, from undesired regions of the point cloud 49. For example, the statistical outlier removal step can include a process of removing trailing points and dense points from undesired regions of the point cloud 49 including portions of the point cloud 49 that correspond to edges of objects, e.g., the edges of canes of a vine.

In a preferred embodiment, the statistical outlier removal step includes removing points that are farther away from their neighbors compared to the average for the point cloud 49. For example, for each given point in the point cloud 49, the distances between the point and a predetermined number of neighboring points are calculated in order to calculate an average distance between the given point and neighboring points. Parameters of the statistical outlier removal step include a neighbors parameter and a ratio parameter. The neighbors parameter sets how many neighboring points are considered when calculating the average distance for a given point. The ratio parameter allows setting a threshold level based on the standard deviation of the average distance across the point cloud 49, and determines the degree to which the statistical outlier removal step will remove points from the point cloud 49. In a preferred embodiment, the lower the ratio parameter, the more aggressively the statistical outlier removal step will filter/remove points from the point cloud 49. FIG. 9B shows an example of a front view of a point cloud 49C before the statistical outlier removal step and a front view of the point cloud 49D after the statistical outlier removal step, and a side view of a point cloud 49E before the statistical outlier removal step and a side view of the point cloud 49F after the statistical outlier removal step. The statistical outlier removal step can be used to reduce the noise and number of points from the undesired regions of the point cloud 49, which reduces computation time.

In the examples discussed above, the depth-based thresholding step and the statistical outlier removal step are performed on individual point clouds (e.g., point clouds 49-0 through 49-6) generated during the point cloud generation step S5. However, in addition to or alternatively to performing the depth-based thresholding step and the statistical outlier removal step to the individual point clouds, the depth-based thresholding step and the statistical outlier removal step can also be performed to the mega point cloud 116 generated by the point cloud registration step S6.

In a preferred embodiment of the present invention, the component segmentation step S3 includes identifying different segments (e.g., individual components) of an agricultural item of interest. For example, in a case in which the agricultural item of interest is a grape vine, the component segmentation step S3 can include identifying different segments of the grape vine including the trunk, each individual cordon, each individual spur, and each individual cane.

Figure 10:
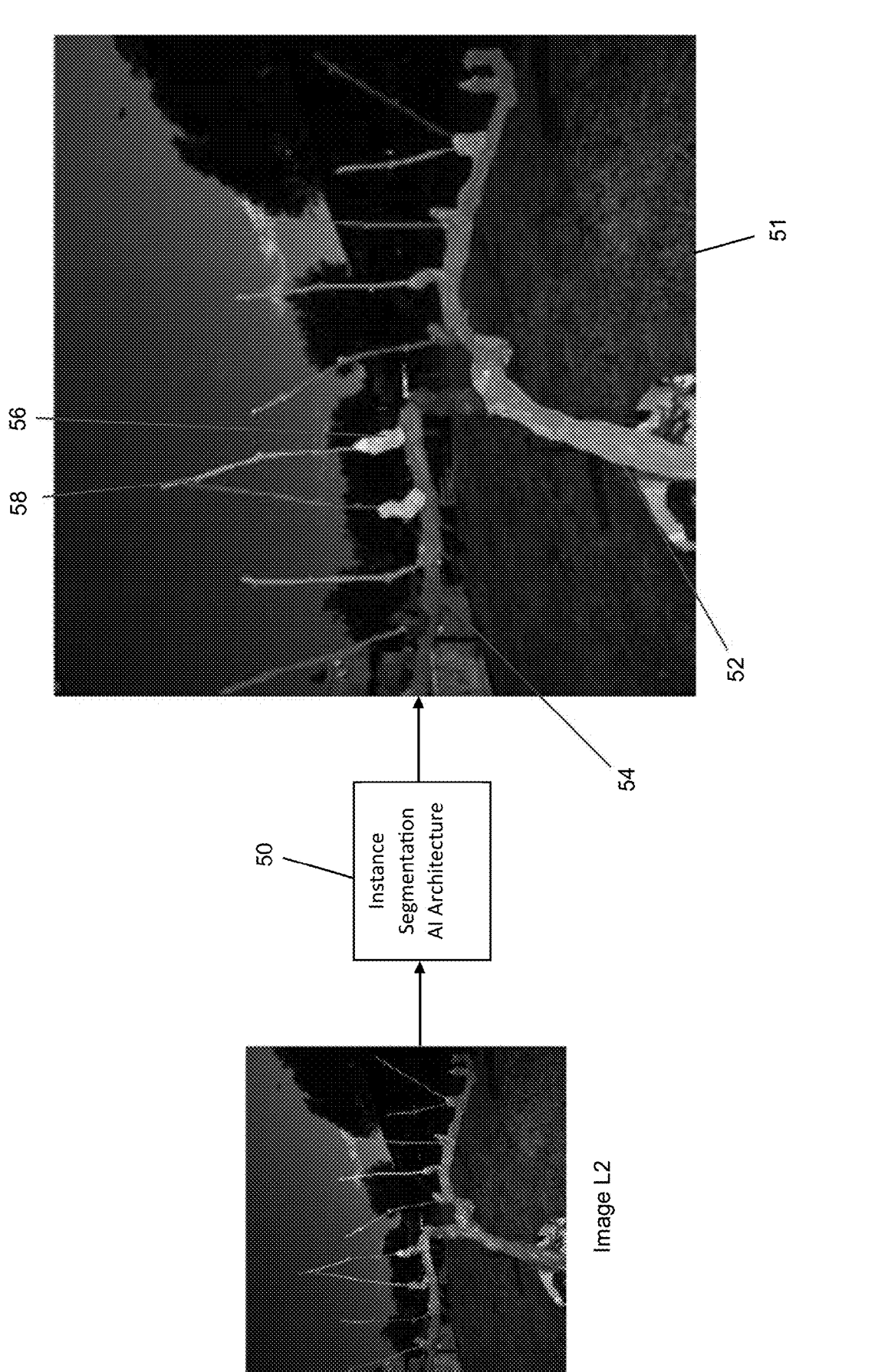
FIG. 10 shows an example of a component segmentation step according to a preferred embodiment of the present invention.

In a preferred embodiment, the component segmentation step S3 is performed using an instance segmentation AI architecture 50. The instance segmentation AI architecture 50 can include a Fully Convolutional Network (FCN), and can be empowered by an instance mask representation scheme, which dynamically segments each instance in an image. FIG. 10 shows an example of the component segmentation step S3 in which an instance segmentation AI architecture 50 is used to identify different segments of an agricultural item of interest (e.g., a grape vine). The input to the instance segmentation AI architecture 50 includes an image of the agricultural item of interest. For example, as shown in FIG. 10, an input to the instance segmentation AI architecture 50 includes an image (e.g., image L2) captured during the image capture step S1. The instance segmentation AI architecture 50 receives the input of the image and outputs a segmented image 51. The segmented image 51 includes one or more masks that identify the different segments/individual components of the agricultural item of interest included in the image input to the instance segmentation AI architecture 50. For example, FIG. 10 shows that the instance segmentation AI architecture 50 outputs a segmented image 51 that includes masks that identify the different segments of grape vine such as the trunk, each individual cordon, each individual spur, and each individual cane. FIG. 10 shows that the segmented image 51 includes masks including a trunk mask 52, a cordon mask 54 that masks an individual cordon, a spur mask 56 that masks an individual spur, and a cane mask 58 that masks an individual cane.

In a preferred embodiment of the present invention, the instance segmentation AI architecture 50 can include mask generation which is decoupled into mask kernel prediction and mask feature learning, which generate convolution kernels and feature maps to be convolved with, respectively.

The instance segmentation AI architecture 50 can significantly reduce or prevent inference overhead with a novel matrix non-maximum suppression (NMS) technique, which takes an image as input (e.g., image L2 shown in FIG. 10), and directly outputs instance masks (e.g., trunk mask 52, cordon mask 54, spur masks 56, and cane masks 58) and corresponding class probabilities, in a fully convolutional, box-free, and grouping-free paradigm.

Figure 11:
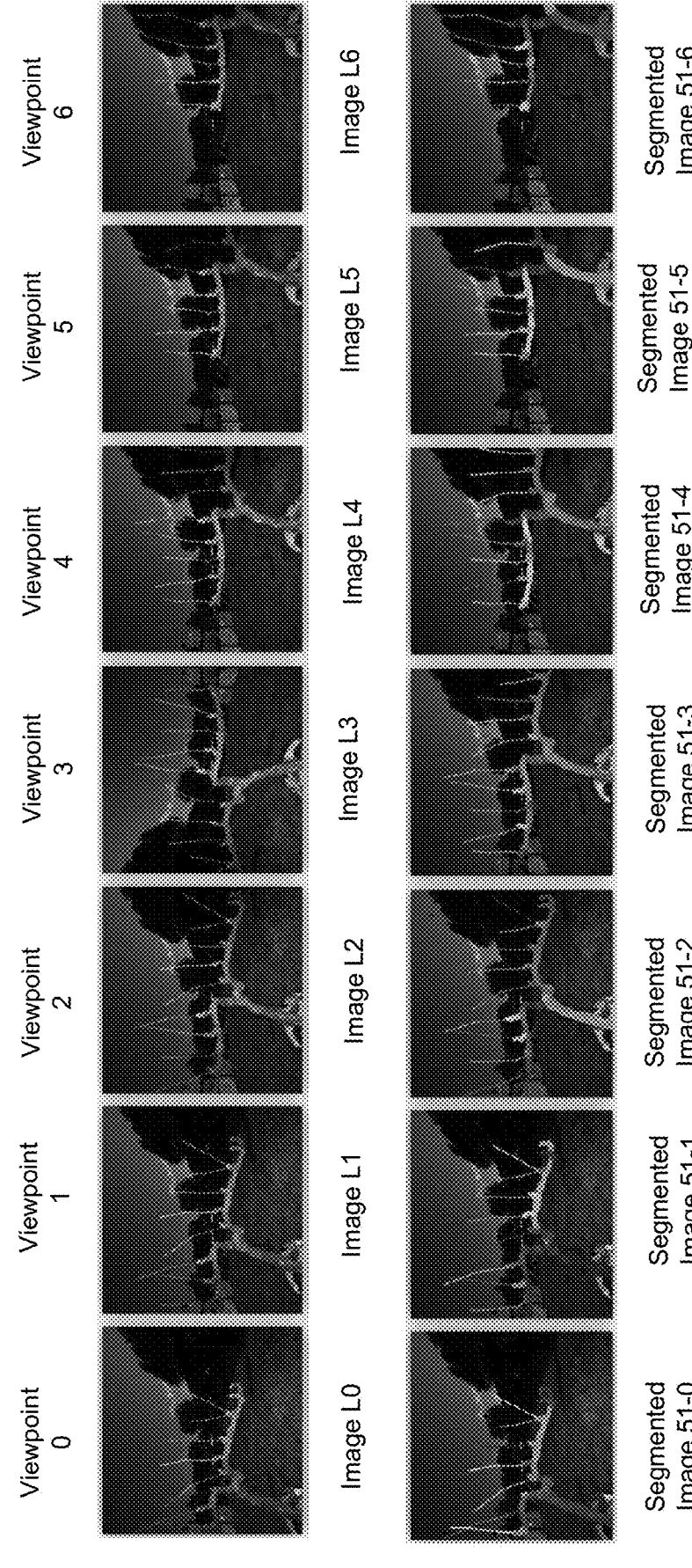
FIG. 11 shows an example of segmented images generated during a component segmentation step according to a preferred embodiment of the present invention.

In a preferred embodiment of the present invention, the component segmentation step S3 includes using the instance segmentation AI architecture 50 to identify the different segments of the agricultural item of interest (e.g., a grape vine) included in the one or more of the plurality of images captured during the image capture step S1. For example, FIG. 11 shows images L0 through L6, which were captured during the image capture step S1, and that can be input to the instance segmentation AI architecture 50 during the component segmentation step S3, and the segmented images 51-0 through 51-6 which are output by the instance segmentation AI architecture 50 when the images L0 through L6 are input to the instance segmentation AI architecture 50.

In a preferred embodiment, the instance segmentation AI architecture 50 uses adaptive learning and dynamic convolutional kernels for the mask prediction, and a Deformable Convolution Network (DCN) is used. For example, the SoloV2 instance segmentation framework can be used to perform the component segmentation step S3. However, the instance segmentation AI architecture 50 can include an instance segmentation framework other than the SoloV2 framework to perform the component segmentation step S3. For example, the instance segmentation AI architecture 50 can include a Mask-RCNN framework which includes a deep neural network that can be used to perform the component segmentation step S3. The instance segmentation AI architecture 50 can also include an instance segmentation framework such as SOLO, TrnsorMask, YOLACT, Polar-Mask, and BlendMask to perform the component segmentation step S3.

In a preferred embodiment of the present invention, the instance segmentation AI architecture 50 is trained using a segmentation dataset tailored to an instant segmentation task with respect to a particular agricultural item of interest. For example, when the agricultural item of interest is a grape vine, the segmentation dataset is tailored to an instant segmentation task with respect to a grape vine. The segmentation dataset includes a plurality of images that are selected based on factors including whether the images were captured with proper operating conditions and whether the images include an appropriate level of variety. Once the plurality of images to be included in the segmentation dataset are selected, the plurality of images are cleansed and annotated. For example, the plurality of images of the segmentation dataset can be manually annotated using a computer implemented labeling tool, as discussed in more detail below.

Figure 12:
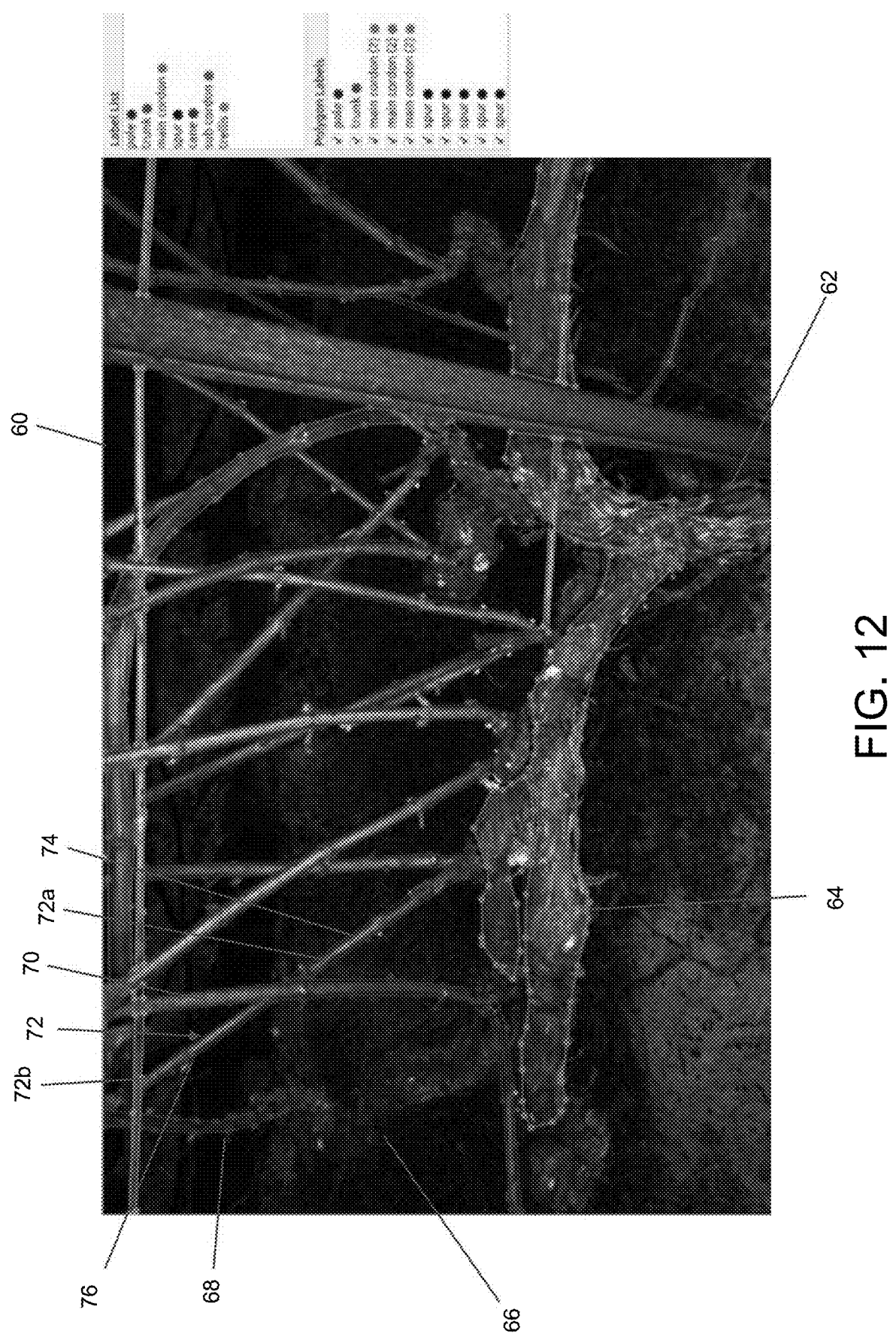
FIG. 12 shows an example of an image annotated using a computer implemented labeling tool according to a preferred embodiment of the present invention.

FIG. 12 shows an example of an image 60 of the segmentation dataset which has been annotated using a computer implemented labeling tool. The computer implemented labeling tool includes a user interface that allows polygon masks to be formed around segments/individual components of the agricultural item of interest. For example, when the agricultural item of interest is a grape vine, the user interface of the labeling tool allows polygon masks to be formed around different segments of the grape vine including the trunk, each individual cordon, each individual spur, and each individual cane. Polygon masks can also be formed around other objects included in the image 60 such as a pole or a trellis that are used to support portions of the agricultural item of interest. Each polygon mask which has been formed around a segment of the agricultural item of interest or other object is assigned a label that indicates an instance of the segment of the agricultural item of interest or object around which the polygon mask was formed. For example, FIG. 12 shows a trunk polygon mask 62 formed around the trunk, a cordon polygon mask 64 formed around an individual cordon, a spur polygon mask 66 formed around an individual spur, and a cane polygon mask 68 formed around an individual cane.

In a preferred embodiment of the present invention, the labeling tool allows for a particular type of annotation called group-identification based labelling that can be used to annotate discrete parts of a same segment/individual component using a same label. In other words, group-identification based labelling can be used to annotate discrete parts of a same instance using a same label. FIG. 12 shows an example in which the agricultural item of interest is a grape vine, and the group-identification based labelling can be used to annotate discrete parts of a same cane using a same label. For example, in the image 60 show in FIG. 12, a first cane 70 overlaps/intersects a second cane 72 in the image 60, such that the image 60 includes a first discrete part 72*a* and a second discrete part 72*b* which are spaced apart from each other in the image 60 but are portions of the same second cane 72. The group-identification based labelling allows for a first polygon mask 74 to be formed around the first discrete part 72*a*, a second polygon mask 76 to be formed around the second discrete part 72*b*, and for the first polygon mask 74 and the second polygon mask 76 to be assigned a same label in order to indicate that the first discrete part 72*a* and the second discrete part 72*b* are portions of the same second cane 72, and thus assigned a common label.

In a preferred embodiment of the present invention, about 80% of the segmentation dataset is used as a training set to train and teach the network of the instance segmentation AI architecture, and about 20% of the segmentation dataset is used as a validation set/test set for the network included in the instance segmentation AI architecture 50. However, these percentages can be adjusted such that more or less of the segmentation dataset is used as a training set and a validation set/test.

Figure 13:
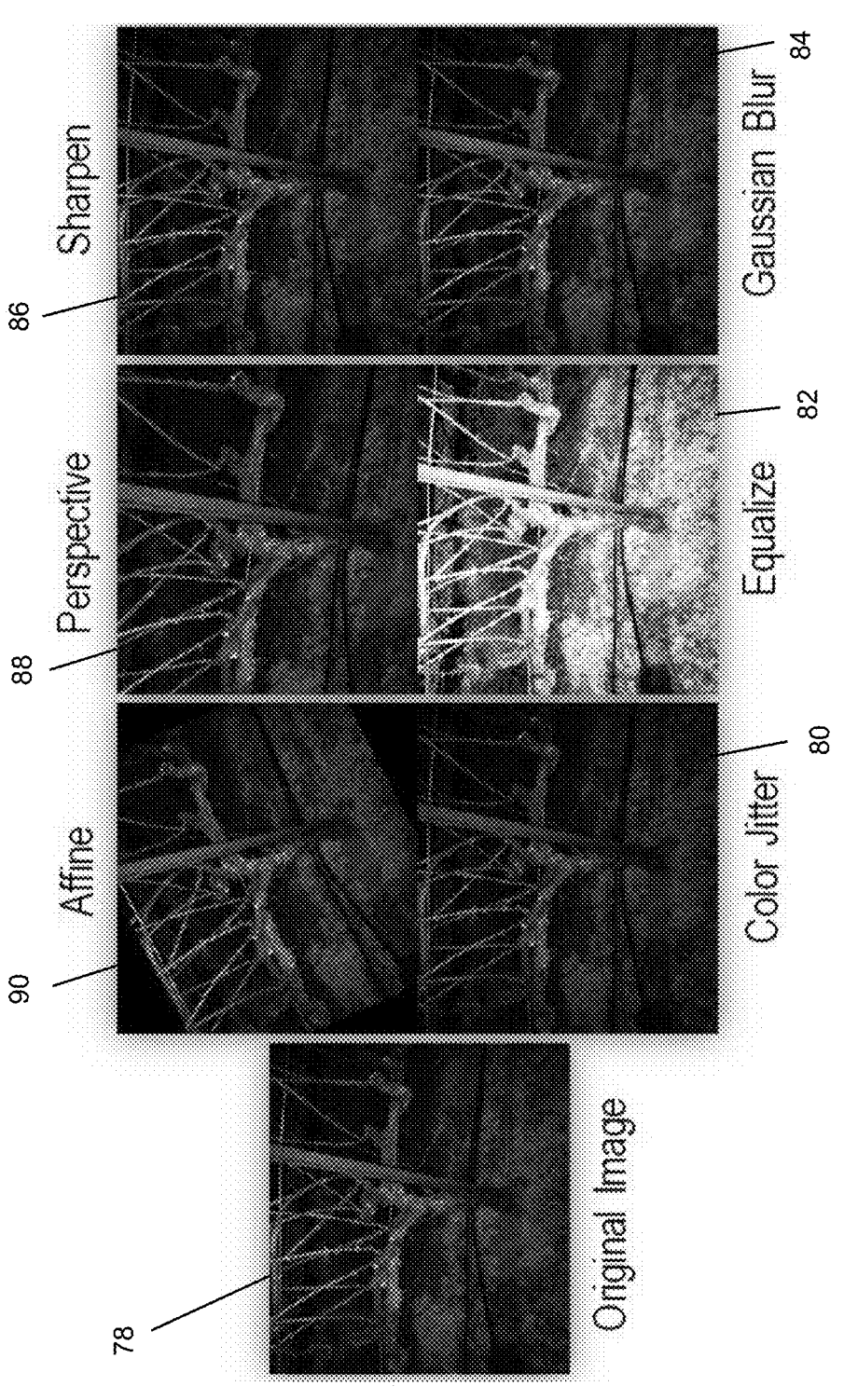
FIG. 13 shows an augmentation process according to a preferred embodiment of the present invention.

In a preferred embodiment of the present invention, an augmentation process can be used to create additional images for the segmentation dataset from existing images included in the segmentation dataset. As shown in FIG. 13, the augmentation process can include editing and changing an originally captured image 78 to create new images that can be included in the segmentation dataset to create a good distribution of images from which the network of the instance segmentation AI architecture 50 learns/trains. The augmentation process can include a plurality of different relative augmentations applied to the originally captured image 78 which allows for the network of the instance segmentation AI architecture 50 to learn and generalize over a wide range of illuminations conditions, textures, and spatial augmentations.

FIG. 13 shows examples of augmentations that can be performed to an originally captured image 78 in the augmentation process. For example, the augmentation process can include a non-perspective augmentation such as a color jitter augmentation 80, an equalize augmentation 82, a gaussian blur augmentation 84, and a sharpen augmentation 86, and/or a spatial augmentation such as a perspective augmentation 88 and an affine augmentation 90. The non-perspective augmentations can be included in a custom data-loader which works on-the-fly and reduces memory constraints. The spatial augmentations can be manually added and saved before the network of the instance segmentation AI architecture 50 is trained using an updated segmentation dataset.

Figure 14:
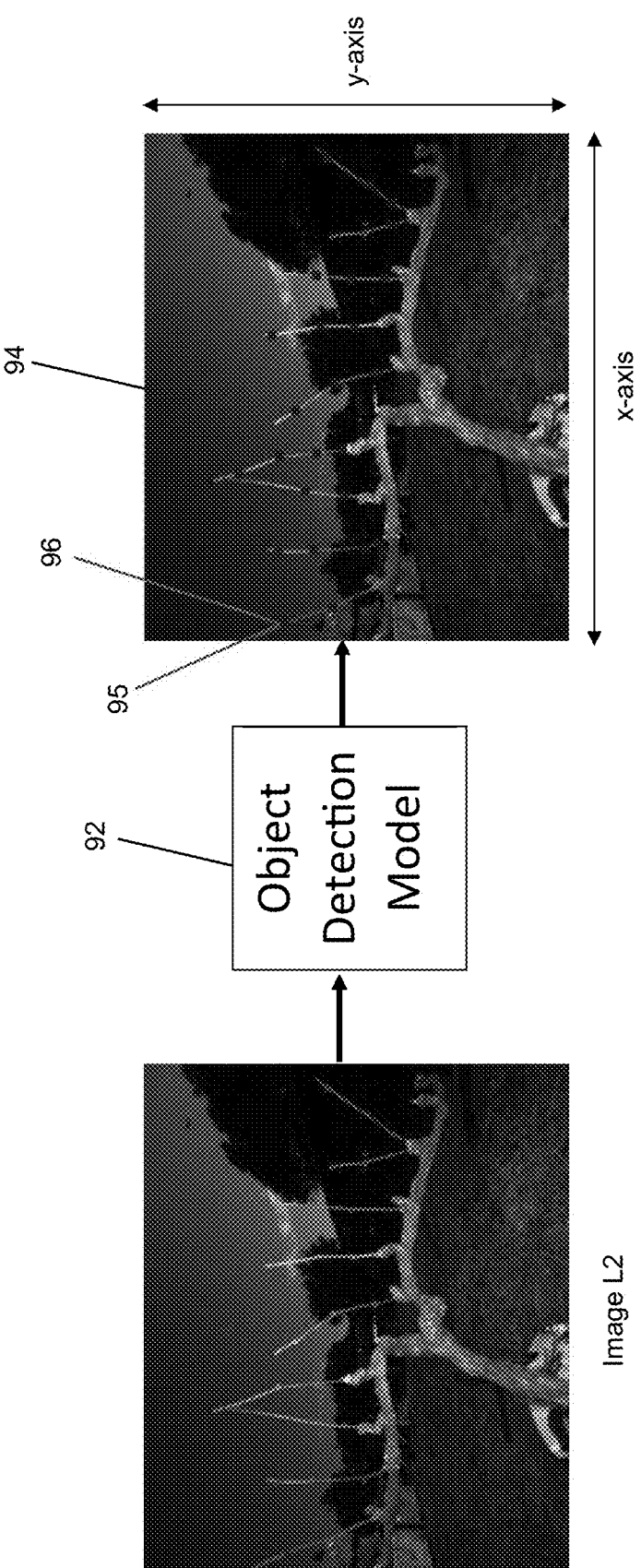
FIG. 14 shows an example of an agricultural feature detection step according to a preferred embodiment of the present invention.

In preferred embodiment of the present invention, the agricultural feature detection step S4 includes detecting a particular agricultural feature of the agricultural item of interest. For example, in a case in which the agricultural item of interest is a grape vine, the agricultural feature detection step S4 can include detecting one or more buds of the grape vine. The agricultural feature detection step S4 can be performed using an object detection model 92, for example, an AI Deep Learning object detection model. FIG. 14 shows an example of the agricultural feature detection step S4 in which an object detection model 92 is used to detect/identify a particular agricultural feature of an agricultural item of interest (e.g., a grape vine). The input to the object detection model 92 includes an image of the agricultural item of interest. For example, as shown in FIG. 14, an input to the object detection model 92 can include a first image (e.g., image L2) captured during the image capture step S1. The object detection model 92 receives the input of the first image and outputs a feature image 94 that includes bounding boxes 96 that surround the particular agricultural feature shown in the first image. For example, FIG. 14 shows that the object detection model 92 outputs a feature image 94 that includes bounding boxes 96 that surround the buds included in the first image.

In a preferred embodiment of the present invention, an agricultural feature location 95 of the agricultural feature (e.g., the bud) can be defined by an x-coordinate and a y-coordinate of a center point of the bounding box 96 that surrounds the agricultural feature. For example, the agricultural feature location 95 can be defined by the x-coordinate and the y-coordinate of the pixel within the feature image 94 that includes the center point of the bounding box 96 that surrounds the agricultural feature. Alternatively, the x-coordinate and the y-coordinate of another point within or on the bounding box 96 (e.g., the bottom left corner, the bottom right corner, the top left corner, or the top right corner of the bounding box 96) can be used to define the agricultural feature location 95. Thus, an agricultural feature location 95 can be determined for each of the agricultural features (e.g., buds) detected during the agricultural feature detection step S4.

Figure 15:
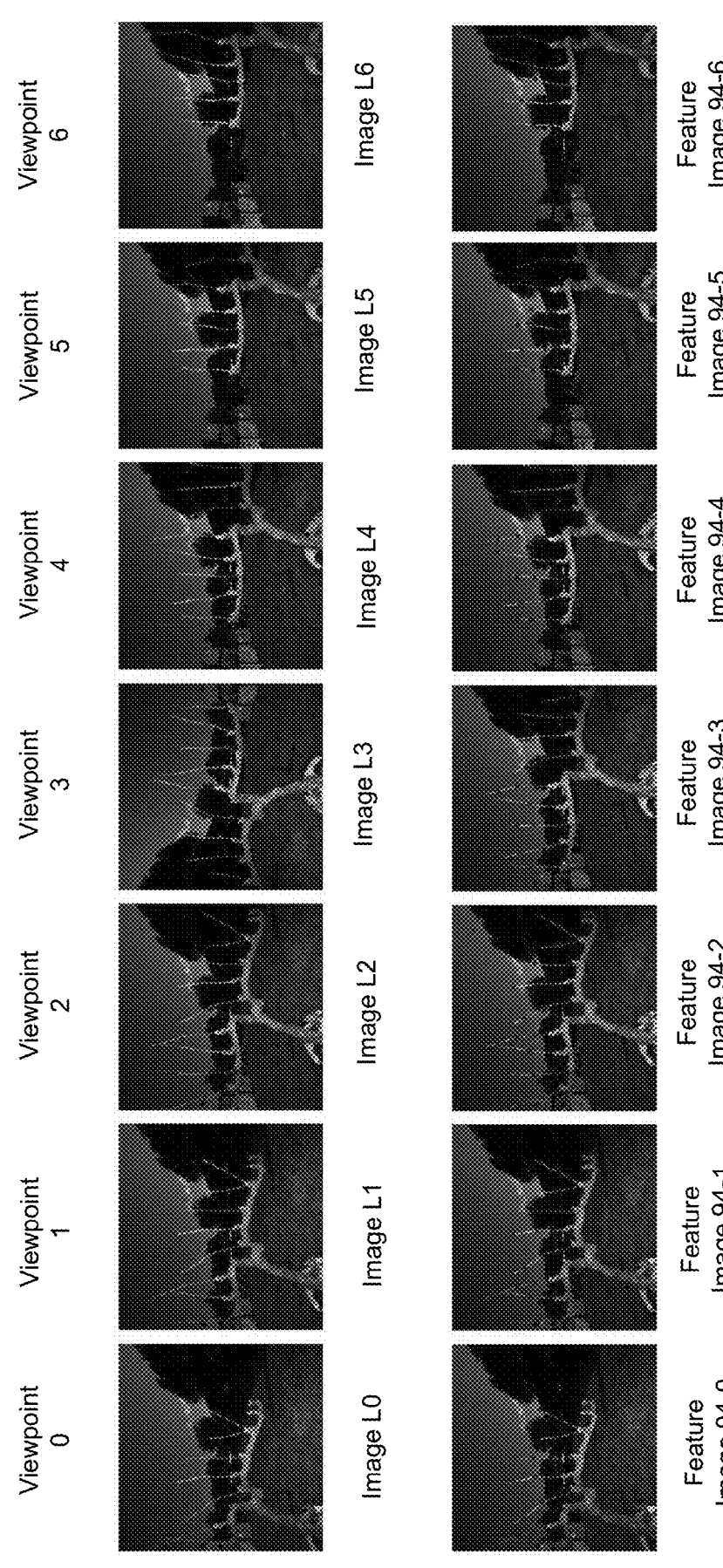
FIG. 15 shows an example of feature images generated during an agricultural feature detection step according to a preferred embodiment of the present invention.

In a preferred embodiment of the present invention, the agricultural feature detection step S4 includes using the object detection model 92 to detect/identify the agricultural features included in each of the plurality of images captured during the image capture step S1. For example, FIG. 15 shows images L0 through L6 captured during the image capture step S1 and input to the object detection model 92 during the agricultural feature detection step S4, and feature images 94-0 through 94-6 which are output by the object detection model 92 based on the images L0 through L6. The object detection model 92 can include a model backbone, a model neck, and a model head. The model backbone is primarily used to extract important features from a given input image (e.g., image L2 in FIG. 14). In a preferred embodiment, Cross Stage Partial (CSP) Networks can be used as the model backbone to extract informative features from the input image. The model neck is primarily used to generate feature pyramids, which assist the object detection model 92 to be well generalized on object scaling of the agricultural feature (e.g., a bud of the grape vine). The performance of the object detection model 92 is improved by identifying the same object (e.g., a grape vine bud) with different scales and sizes. The model head is primarily used to perform the final detection of the agricultural feature. The model head applies anchor boxes on the agricultural features included in the image features and generates final output vectors with class probabilities, object scores, and the bounding boxes 96 of the feature image 94.

In a preferred embodiment of the present invention, the agricultural feature detection step S4 is performed using an object detection model 92 such as YoloV5. However, other models such as Yolov4 can be used to perform the agricultural feature detection step S4. The trained object detection model 92 can be converted to a TensorRT optimized engine for faster inference.

The object detection model 92 can be trained using a detection dataset tailored to an object detection task with respect to an agricultural feature. For example, when the agricultural feature is a bud of a grape vine, the detection dataset is tailored to an object detection task with respect to a bud of a grape vine. The detection dataset includes a plurality of the images that are selected based on factors including whether the images were captured with proper operating conditions and whether the images include an appropriate level of variety. Once the plurality of images to be included in the detection dataset are selected, the images are cleansed and annotated. For example, the images of the detection dataset tailored to an object detection task with respect to a bud of a grape vine can be manually annotated using a computer implemented labeling tool.

Figure 16:
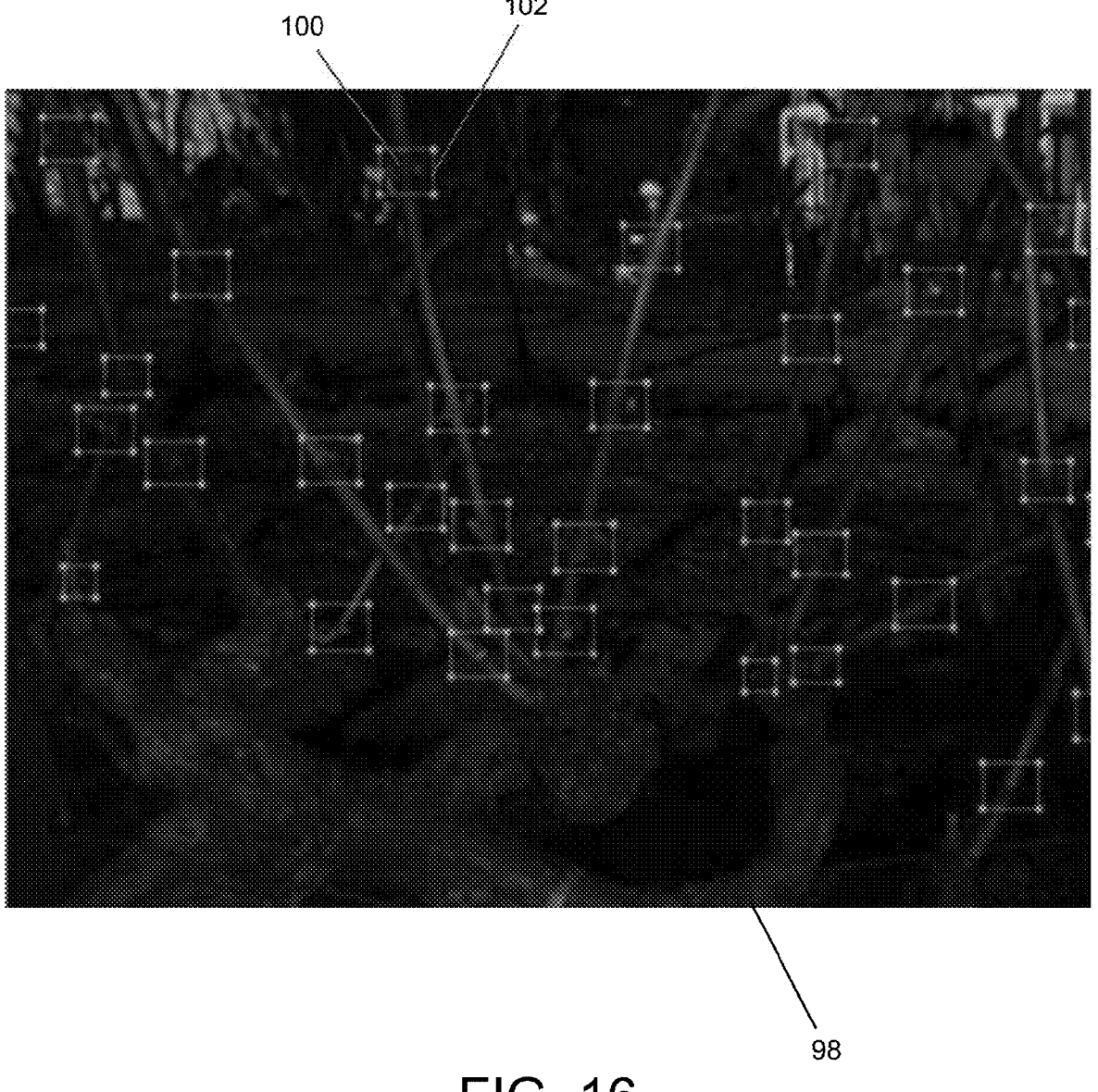
FIG. 16 shows an example of an image annotated using a computer implemented labeling tool according to a preferred embodiment of the present invention.

FIG. 16 shows an example of an image 98 included in the detection dataset which has been annotated using a computer implemented labeling tool. The computer implemented labeling tool includes a user interface that allows polygon masks to be formed around a particular agricultural feature 100 of the agricultural item of interest. For example, when the agricultural feature 100 is a bud of a grape vine, the user interface of the labeling tool allows a polygon mask 102 to be formed around each bud of the grape vine. In a preferred embodiment, polygon masks 102 of different sizes can be formed around the agricultural features 100 in the image 98. For example, the size of the polygon mask 102 can be determined based on the size of the particular agricultural feature 100 around which the polygon mask 102 is formed. For instance, when a distance between a particular agricultural feature 100 and the camera used to capture the image 98 is larger such that the size of the particular agricultural feature 100 within the image 98 is smaller, then the size of the polygon mask 102 formed around the particular agricultural feature 100 is made smaller. More specifically, in a preferred embodiment, the size of each of the polygon masks 102 formed around the agricultural features 100 within the image 98 can be determined/adjusted based on a predetermined ratio of a pixel area of the agricultural feature 100 to a total pixel area of the polygon mask 102. For example, the size of the polygon mask 102 formed around the agricultural feature 100 within the image 98 can be determined/adjusted such that a ratio between a pixel area of the agricultural feature 100 to a total pixel area of the polygon mask 102 is a predetermined ratio of 50% (i.e., the area of the agricultural feature 100 is 50% of the total area of the polygon mask 102). Alternatively, each of the polygon masks 102 can be made a same size regardless of the size of the particular agricultural feature 100 around which the polygon mask 102 is formed.

In a preferred embodiment of the present invention, about 80% of the detection dataset is used as a training set to train and teach the network of the object detection model 92, and about 20% of the detection data set is used as a validation set/test set for the network of the object detection model 92. However, these percentages can be adjusted such that more or less of the dataset is used as a training set and a validation set/test.

In a preferred embodiment of the present invention, an augmentation process can be used to create additional images for the detection dataset from existing images included in the detection dataset. As shown in FIG. 13, the augmentation process can include editing and changing an originally captured image 78 to create new images to be included in the detection dataset in order to create a good distribution of images in the detection dataset for the network of the object detection model 92 to train/learn. The augmentation process can include a plurality of different relative augmentations applied to an originally captured image 78 which allows for the network of the object detection model 92 to learn and generalize over a wide range of illuminations conditions, textures, and spatial augmentations.

FIG. 13 shows examples of augmentations that can be performed to an originally captured image 78 in the augmentation process. For example, FIG. 13 shows that the augmentation process can include a non-perspective augmentation such as a color jitter augmentation 80, an equalize augmentation 82, a gaussian blur augmentation 84, and a sharpen augmentation 86, and/or a spatial augmentation such as a perspective augmentation 88 and an affine augmentation 90. In a preferred embodiment, the non-perspective augmentations can be included in a custom data-loader which works on-the-fly and reduces memory constraints. The spatial augmentations can be manually added and saved before the network of the object detection model 92 is trained using the updated dataset.

Figure 17:
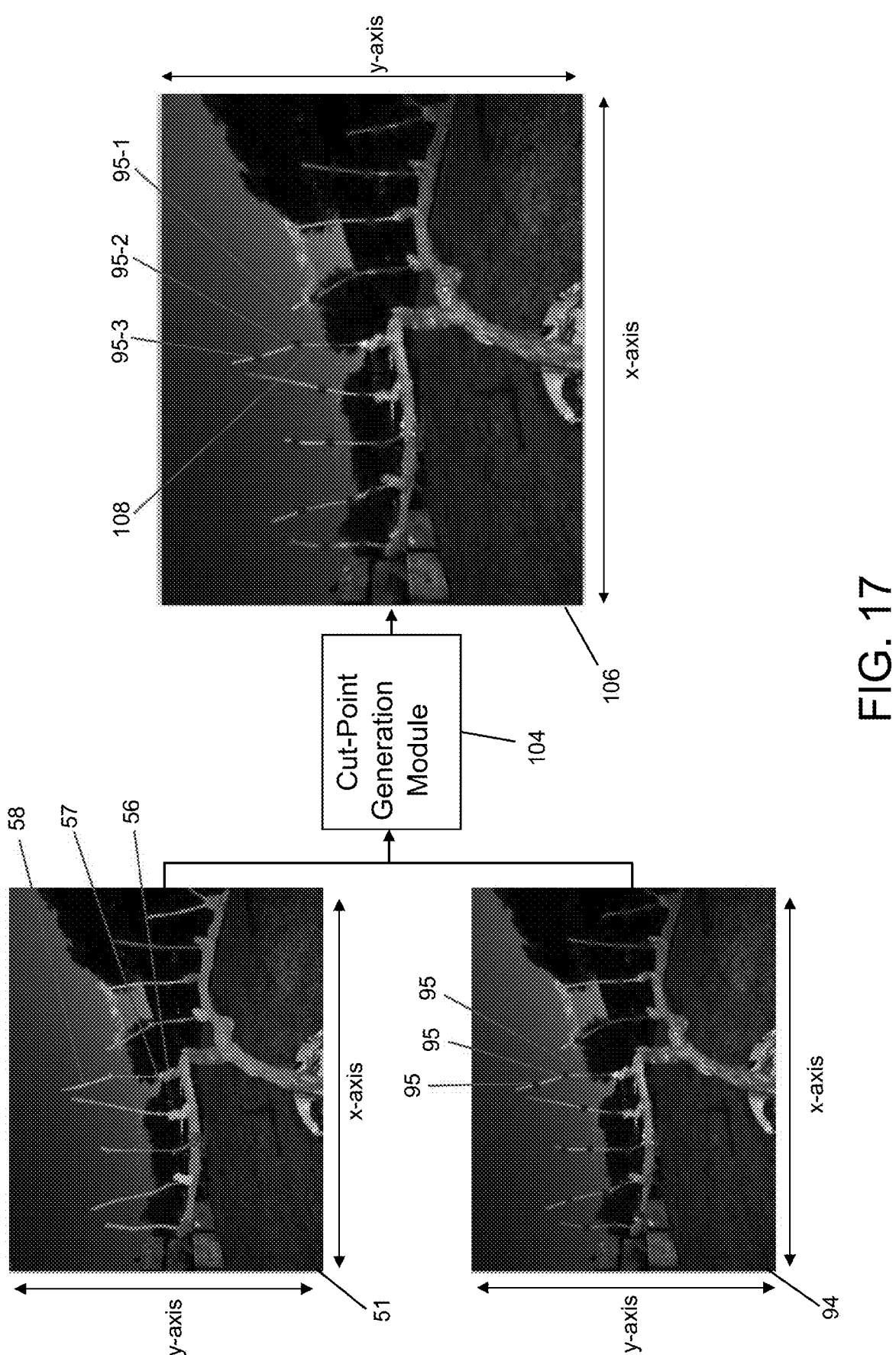
FIG. 17 shows an example of a cut-point generation step according to a preferred embodiment of the present invention.

In a preferred embodiment of the present invention, the cut-point generation step S7 includes using a cut-point generation module 104 to generate a two-dimensional cut point 108. When the agricultural item of interest is a grape vine, the cut-point generation module 104 generates a two-dimensional cut-point 108 for a cane of the grape vine. Preferably, the cut-point generation module 104 generates a two-dimensional cut-point 108 for each of the canes included in the grape vine. For illustrative purposes, FIG. 17 shows an example of a two-dimensional cut-point 108 on a cut-point image 106. The location of the two-dimensional cut-point 108 can be represented by an x-coordinate and a y-coordinate. For example, the location of the two-dimensional cut-point 108 can be defined by the x-coordinate and y-coordinate of the pixel of the cut-point image 106 that includes the two-dimensional cut-point 108.

As shown in FIG. 17, the cut-point generation module 104 receives inputs including the masks from the segmented image 51 generated by the Instance Segmentation AI Architecture 50 during the component segmentation step S3 and the agricultural feature locations 95 of the agricultural features (e.g., buds) detected during the agricultural feature detection step S4. For example, FIG. 17 shows that the inputs to the cut point generation module 104 include the masks from the segmented image 51 (e.g., segmented image 51-2) and the agricultural feature locations 95 of the agricultural features (buds) included in the corresponding feature image 94 (e.g., feature image 94-2), which were both generated using the image L2 captured from viewpoint 2 during the image capture step S1.

Figure 18:
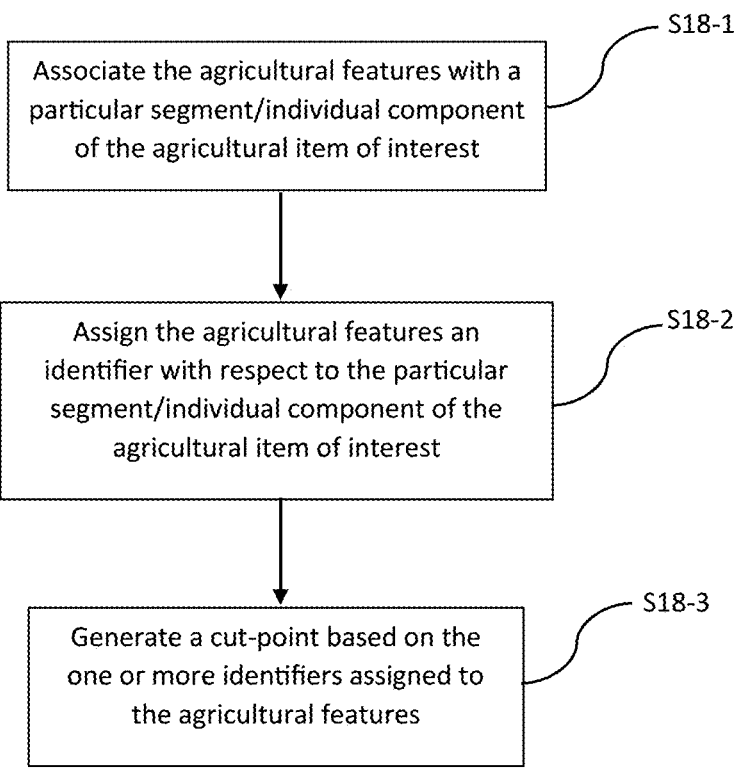
FIG. 18 is a flow chart showing a cut-point generation step according to a preferred embodiment of the present invention.

In a preferred embodiment of the present invention, the cut-point generation module 104 performs an agricultural feature association step S18-1, an agricultural feature identification step S18-2, and a cut-point generation step S18-3 to generate the two-dimensional cut-point 108. FIG. 18 shows a flow chart of the cut-point generation step S7 including the agricultural feature association step S18-1, the agricultural feature identification step S18-2, and the cut-point generation step S18-3.

In the agricultural feature association step S18-1, the agricultural features detected during the agricultural feature detection step S4 are associated with a particular segment/individual component of the agricultural item of interest identified during the component segmentation step S3. For example, when the agricultural features are buds of a grape vine, each bud detected during the agricultural feature detection step S4 is associated with a particular cane of the grape vine identified during the component segmentation step S3. In the example shown in FIG. 17, if an agricultural feature location 95 (bud location 95) falls/lies within a particular cane mask 58 when the bud location 95 is compared to the cane masks 58 of the segmented image 51, then the bud associated with the bud location 95 is considered to be located on/attached to the cane associated with the particular cane mask 58. For example, it can be determined that an agricultural feature location 95 (bud location 95) falls/lies within a cane mask 58 if an agricultural feature location 95 pixel of the feature image 94 corresponds to a cane mask 58 pixel of the of the segmented image 51. In this way, a bud detected during the agricultural feature detection step S4 can be associated with a particular cane/cane mask 58 identified during the component segmentation step S3.

It is possible that an agricultural feature location 95 (bud location 95) does not fall/lie within a particular cane mask 58 when the bud location 95 is compared to the cane masks 58 of the segmented image 51. For example, because a bud is attached to an outside surface of the cane, the agricultural feature location 95 (bud location 95) may be adjacent to the cane mask 58 and not fall/lie within the cane mask 58. In order to address this issue, the agricultural feature location 95 is assigned a search radius. If the agricultural feature location 95 is determined to be located within the area of the cane mask 58, then the agricultural feature location 95 is maintained. On the other hand, if the agricultural feature location 95 is determined not to be located within the area of a cane mask 58, then the search radius is used to determine if the agricultural feature location 95 is located within a predetermined distance of a cane mask 58. If a cane mask 58 is determined to be located within a predetermined distance of the agricultural feature location 95 using the search radius, then the location of the agricultural feature location 95 is moved to a point within the area of the cane mask 58, for example, a closest point within the area of the cane mask 58. On the other hand, if the cane mask 58 is determined to not be located within a predetermined distance from the agricultural feature location 95 using the search radius, then the agricultural feature location 95 is determined not to be located on or associated with a cane mask 58.

The agricultural feature identification step S18-2 includes assigning each agricultural feature an identifier with respect to the particular segment/individual component of the agricultural item of interest to which the agricultural feature was associated with in the agricultural feature association step S18-1. For example, when the agricultural feature is a bud of the grape vine, each bud is assigned an identifier with respect to the particular cane/cane mask 58 to which the bud was associated with in the agricultural feature association step S18-1.

The agricultural feature identification step S18-2 can include identifying a starting point 57 of the cane mask 58, which is located at a connection point between the spur mask 56 and the cane mask 58. For example, the connection point between the spur mask 56 and the cane mask 58 can be identified by a pixel that falls within both the spur mask 56 and the cane mask 58, which indicates an overlap between the spur mask 56 and the cane mask 58. Once the starting point 57 of the cane mask 58 has been identified, each bud detected during the agricultural feature detection step S4 can be assigned an identifier with respect to the particular cane/cane mask 58 to which the bud was associated with in the agricultural feature association step S18-1 based on a distance from the starting point 57 of the cane mask 58 to the respective bud. In the example shown in FIG. 17, the agricultural feature location 95-1 is closest to the starting point 57 of the cane mask 58 (the connection between the spur mask 56 and the cane mask 58), the agricultural feature location 95-2 is the second closest to the starting point 57 of the cane mask 58, and the agricultural feature location 95-3 is the third closest to the starting point 57 of the cane mask 58. The agricultural feature locations 95-1, 95-2, and 95-3 are illustrated on the cut-point image 106 in FIG. 17.

Based on the respective distances of the agricultural feature locations 95-1, 95-2, and 95-3 from the starting point 57 of the cane mask 58, each agricultural feature can be assigned an identifier with respect to the particular segment/individual component of the agricultural item of interest to which the agricultural feature is associated. For example, the bud with agricultural feature location 95-1 can be assigned as the first bud of the cane associated with the cane mask 58, the bud with agricultural feature location 95-2 can be assigned as the second bud of the cane associated with the cane mask 58, and the bud with agricultural feature location 95-3 can be assigned as the third bud of the cane associated with the cane mask 58.

The cut-point generation step S18-3 includes executing a cut-point generation algorithm to generate the two-dimensional cut-point 108. The cut-point generation algorithm uses one or more rules to generate the two-dimensional cut-point 108 based on one or more of the identifiers assigned to the agricultural features in the agricultural feature identification step S18-2. For example, when the agricultural features are the buds of a grape vine, and the particular segment/individual component of the agricultural item of interest is a particular cane/cane mask 58 of the grape vine, the rules can include that a two-dimensional cut-point 108 is to be generated between the first bud with agricultural feature location 95-1 and the second bud with agricultural feature location 95-2 when the cane includes more than one bud (when more than one agricultural feature location 95 is located within the cane mask 58). More specifically, the rules can include that a cut-point 108 is to be generated at a middle point (an approximately 50% point) between the agricultural feature location 95-1 and the agricultural feature location 95-2. Alternatively, the rules can include that a cut-point 108 is to be generated at another point (e.g., an approximately 30% point or an approximately 70% point) between the agricultural feature location 95-1 and the agricultural feature location 95-2. Alternatively, the rules can include that a cut-point 108 is to be generated at a predetermined distance from the agricultural feature location 95-1. The one or more rules can also include that no cut-point is to be generated if the cane includes a single bud or no bud, for example, if a single agricultural feature location 95 or no agricultural feature location 95 is located within the cane mask 58.

In a preferred embodiment of the present invention, the one or more rules can be different or changed from the rules described above. For example, the one or more rules can include that the cut-point 108 is to be generated between the second bud with agricultural feature location 95-2 second closest to the starting point 57 of the cane mask 58 and the third bud with agricultural feature location 95-3 third closest to the starting point 57 of the cane mask 58 when the cane includes more than two buds (when more than two agricultural feature locations 95 are located within the cane mask 58).

In a preferred embodiment of the present invention, it is possible that the two-dimensional cut-point 108 generated during the cut-point generation step S18-3 is not located on the cane/located within the cane mask 58. For example, if the cut-point 108 is generated at a middle point (an approximately 50% point) between the agricultural feature location 95-1 and the agricultural feature location 95-2 and the cane between the agricultural feature location 95-1 and the agricultural feature location 95-2 is bent or curved, it is possible that the generated cut-point 108 is not located on the cane/located within the cane mask 58. In order to address this issue, the cut-point 108 is assigned a search radius. If the cut-point 108 generated during the cut-point generation step S18-3 is determined to be located within the area of the cane mask 58, then the location of the cut-point 108 is maintained. On the other hand, if the cut-point 108 generated during the cut-point generation step S18-3 is determined not to be located within the area of the cane mask 58, then the search radius is used to determine if the cut-point 108 generated during the cut-point generation step S18-3 is located within a predetermined distance of the cane mask 58. If the cut-point 108 is determined to be located within a predetermined distance of the cane mask 58 using the search radius, then the location of the cut-point 108 is moved to a point within the area of the cane mask 58, such as the point within the area of the cane mask 58 that is closest to the cut-point 108 generated during the cut-point generation step S18-3. On the other hand, if the cut-point 108 is determined to not be located within a predetermined distance from a cane mask 58 using the search radius, then the cut-point 108 is deleted.

Figure 19:
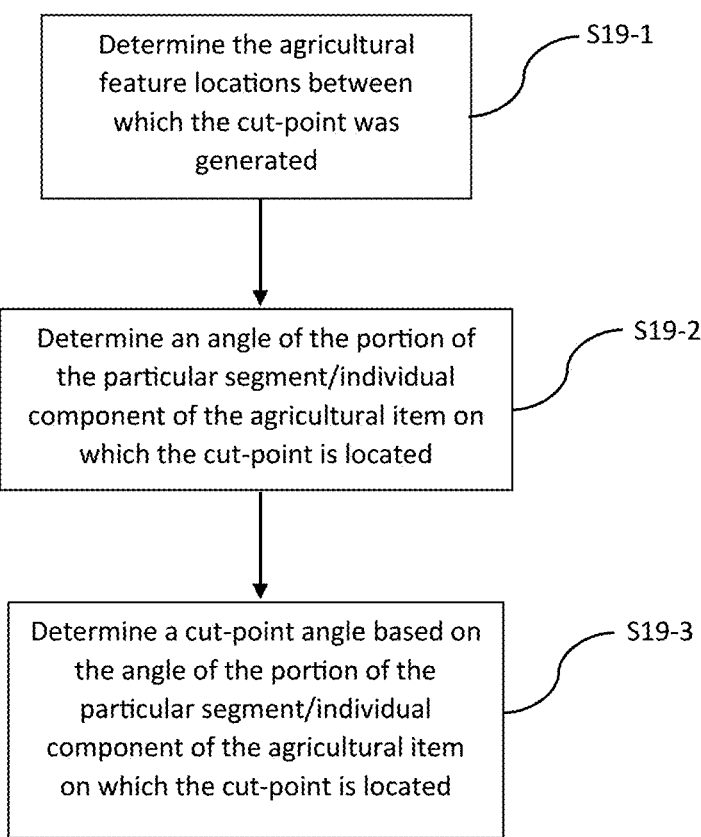
FIG. 19 is a flow chart showing a process of determining a cut-point angle according to a preferred embodiment of the present invention.
Figure 20:
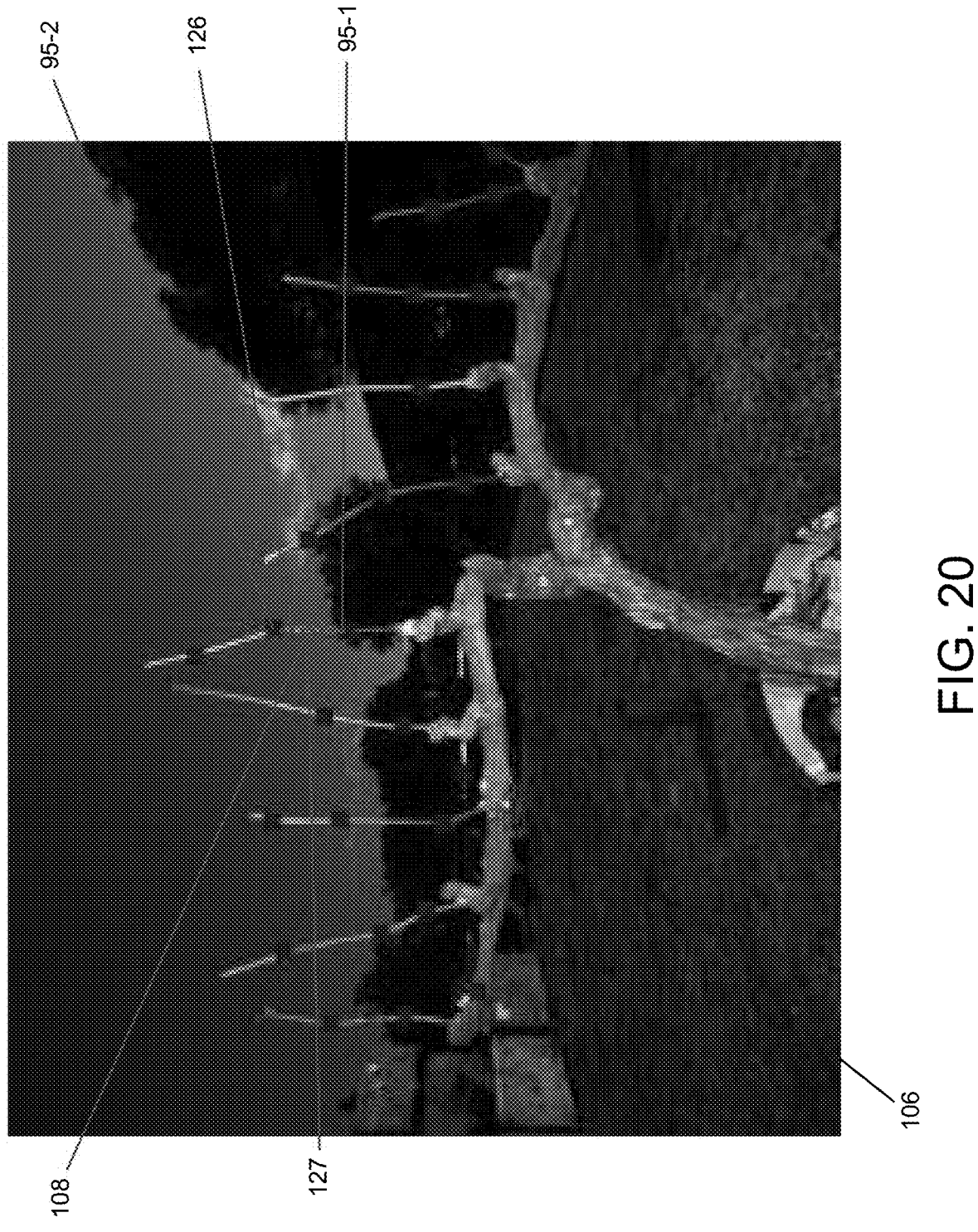
FIG. 20 shows a feature image illustrating a process of determining a cut-point angle according to a preferred embodiment of the present invention

In a preferred embodiment of the present invention, a cut-point angle is determined for the two-dimensional cut-point 108. An example of the process used to determine the cut-point angle is shown in the flowchart of FIG. 19. In step S19-1, the agricultural feature locations 95 between which the cut-point 108 was generated are identified. For example, as shown in FIG. 20, the agricultural feature location 95-1 and the agricultural feature location 95-2 between which the cut-point 108 was generated are identified. In step S19-2, an angle of the portion of the particular segment/individual component of the agricultural item on which the cut-point 108 is located is determined using the agricultural feature locations 95 identified in step S19-1. For example, the angle of the portion of cane on which the cut-point 108 is located is determined by forming a line 126 that connects the agricultural feature location 95-1 and the agricultural feature location 95-2. Once the angle of the portion of the particular segment/individual component of the agricultural item on which the cut-point 108 is located is determined in step S19-2, a cut-point angle for the cut-point 108 can be determined in step S19-3 by forming a line 127 at an angle with respect to the line 126, for example, perpendicular to the line 126. The line 127 can also be formed at another angle with respect to the line 126, such as 30 degrees or 45 degrees with respect to the line 126, for example. The angle of the line 127 defines the cut-point angle of the cut-point 108, which is an angle with respect to the particular segment/individual component of the agricultural item on which the cut-point 108 is located.

In a preferred embodiment of the present invention, the cut-point generation step S7 includes using the cut-point generation module 104 to generate sets of two-dimensional cut-points 108 using the plurality of images captured from the plurality of viewpoints (e.g., viewpoints 0-6) during the image capture step S1. For example, the cut-point generation step S7 can include using the cut-point generation module 104 to generate a set of two-dimensional cut-points 108 (e.g., a cut-point 108 for each cane) for each of the viewpoints from which images were captured during the image capture step S1. The cut-point generation module 104 can generate a first set of cut-points 108 based on the masks of the segmented image 51-0 (see FIG. 11) and the agricultural feature locations 95 from the feature image 94-0 (see FIG. 15), a second set of cut-points 108 based on the masks of the segmented image 51-1 (see FIG. 11) and the agricultural feature locations 95 from the feature image 94-1 (see FIG. 15), a third set of cut-points 108 based on the masks of the segmented image 51-2 (see FIG. 11) and the agricultural feature locations 95 from the feature image 94-2 (see FIG. 15), a fourth set of cut-points 108 based on the masks of the segmented image 51-3 (see FIG. 11) and the agricultural feature locations 95 from the feature image 94-3 (see FIG. 15), a fifth set of cut-points 108 based on the masks of the segmented image 51-4 (see FIG. 11) and the agricultural feature locations 95 from the feature image 94-4 (see FIG. 15), a sixth set of cut-points 108 based on the masks of the segmented image 51-5 (see FIG. 11) and the agricultural feature locations 95 from the feature image 94-5 (see FIG. 15), and a seventh set of cut-points 108 using the masks of the segmented image 51-6 (see FIG. 11) and the agricultural feature locations 95 from the feature image 94-6 (see FIG. 15).

Figure 21:
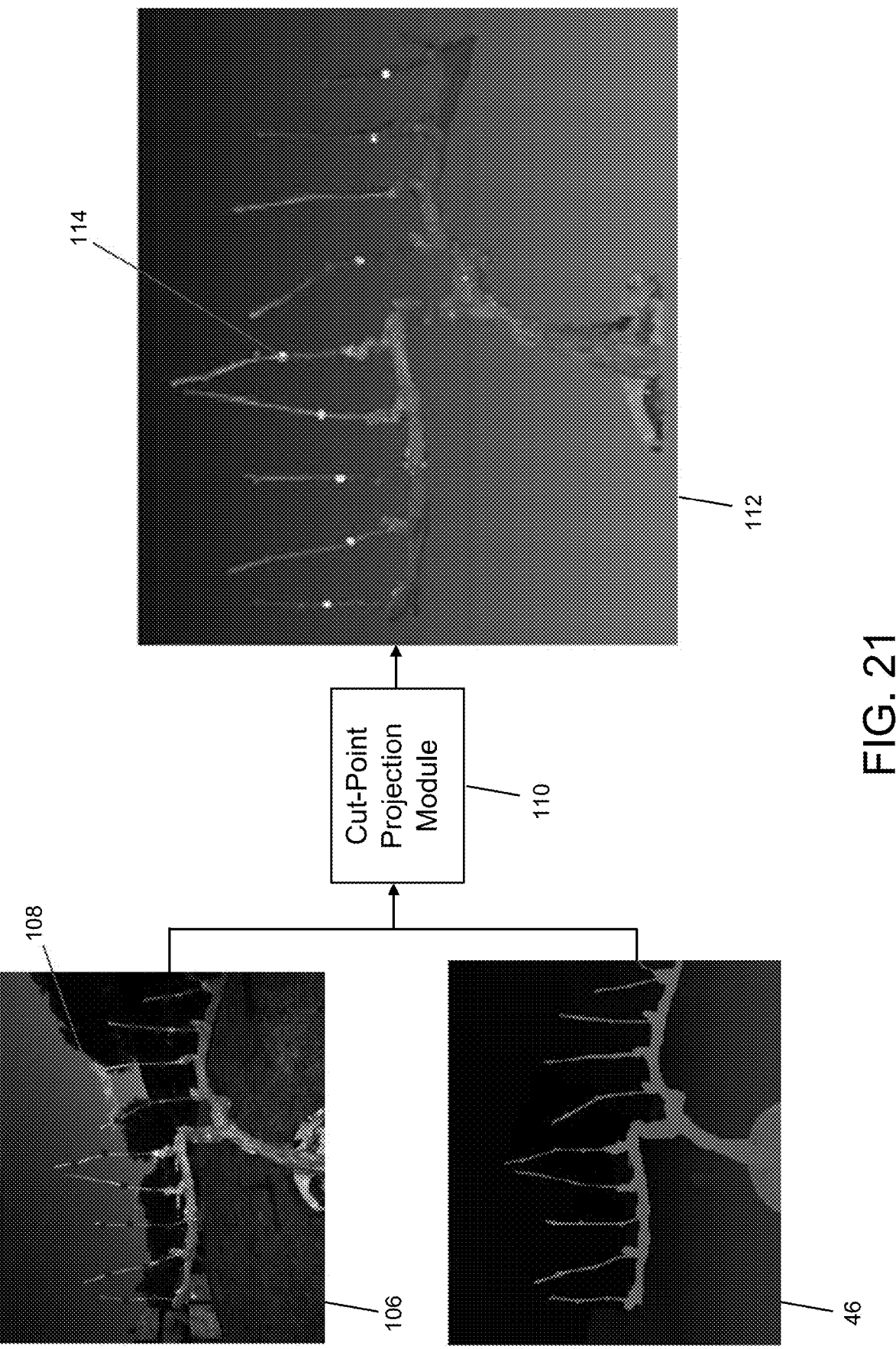
FIG. 21 shows an example of a cut-point projection step according to a preferred embodiment of the present invention.

In a preferred embodiment of the present invention, the cut-point projection step S8 includes using a cut-point projection module 110 to generate three-dimensional cut-points 114. As shown in FIG. 21, the cut-point projection module 110 receives inputs including a set of two-dimensional cut-points 108 generated during the cut-point generation step S7 and a corresponding disparity map 46 generated during the disparity estimation step S2. In FIG. 21, the set of two-dimensional cut-points 108 are shown on a cut-point image 106. For example, the inputs to the cut-point projection module 110 can include the third cut-point image 106 that includes the set of two-dimensional cut-points 108 generated during the cut-point generation step S7 based on the masks of the segmented image 51-2 and the agricultural feature locations 95 of the feature image 94-2, and a corresponding disparity map 46 generated during the disparity estimation step S2 based on image L2 and image R2. That is, the set of two-dimensional cut-points 108 and the corresponding disparity map 46 are both generated based on images captured from a same viewpoint, for example, viewpoint 2 shown in FIG. 5.

The cut-point projection module 110 outputs the three-dimensional cut-points 114, as shown in FIG. 21, for example. For illustrative purposes, in FIG. 21, the three-dimensional cut-points 114 are shown on a three-dimensional cut-point cloud 112. The cut-point projection module 110 generates a three-dimensional cut-point 114 by slicing the location of a two-dimensional cut-point 108 from the disparity map 46, and reprojecting the sliced disparity with known camera configurations of the camera (e.g., camera 20) to generate the three-dimensional cut-point 114 that corresponds to the two-dimensional cut-point 108. For example, a pixel of the cut-point image 106 that includes the two-dimensional cut-point 108 can be identified, and then a corresponding pixel can be identified in the disparity map 46. The depth value of the corresponding pixel from the disparity map 46 can be used as the depth value of the two-dimensional cut-point 108. In this way, the two-dimensional cut-point 108 can be projected to a three-dimensional cut-point 114 that includes X, Y, and Z coordinates.

In an alternative preferred embodiment of the present invention, the cut-point projection module 110 receives inputs including a set of two-dimensional cut-points 108 generated during the cut-point generation step S7 and a depth estimation of the agricultural item obtained from a LIDAR sensor (e.g., LiDAR system 38), a time-of-flight (TOF) sensor, or another depth sensor that can generate a depth estimation of the agricultural item. For example, the depth estimation of the agricultural item can be obtained from point cloud data generated by a LIDAR sensor that has been calibrated to have a coordinate system that is aligned with a coordinate system of the camera 20, and the set of two-dimensional cut-points 108 can be generated based on images captured using a camera 20 including an RGB camera. The cut-point projection module 110 generates a three-dimensional cut-point 114 by determining a depth value of the two-dimensional cut-point 108 based on the depth estimation of the agricultural item to generate the three-dimensional cut-point 114 that corresponds to the two-dimensional cut-point 108. For example, a coordinate (a pixel) of the cut-point image 106 that includes the two-dimensional cut-point 108 can be identified, and then a corresponding coordinate can be identified in the depth estimation of the agricultural item, such as a corresponding coordinate in the point cloud data generated by the LiDAR sensor. The depth value of the corresponding coordinate from the depth estimation of the agricultural item can be used as the depth value of the two-dimensional cut-point 108. In this way, the two-dimensional cut-point 108 can be projected to a three-dimensional cut-point 114 that includes X, Y, and Z coordinates.

In a preferred embodiment of the present invention, the cut-point projection step S8 includes generating a set of three-dimensional cut-points 114 for each of the plurality of viewpoints (e.g., viewpoints 0-6) from which images were captured by the camera 20 during the image capture step S1. For example, the cut-point projection module 110 can be used to generate a first set of three-dimensional cut-points 114 using the first set of two-dimensional cut-points 108 and the disparity map 46-0, a second set of three-dimensional cut-points 114 using the second set of two-dimensional cut-points 108 and the disparity map 46-1, a third set of three-dimensional cut-points 114 using the third set of two-dimensional cut-point 108 and the disparity map 46-2, a fourth set of three-dimensional cut-points 114 using the fourth set of two-dimensional cut-points 108 and the disparity map 46-3, a fifth set of three-dimensional cut-points 114 using the fifth set of two-dimensional cut-points 108 and the disparity map 46-4, a sixth set of three-dimensional cut-points 114 using the sixth set of two-dimensional cut-points 108 and the disparity map 46-5, and a seventh set of three-dimensional cut-points 114 using the seventh set of two-dimensional cut-points 108 and the disparity map 46-6.

Figure 22:
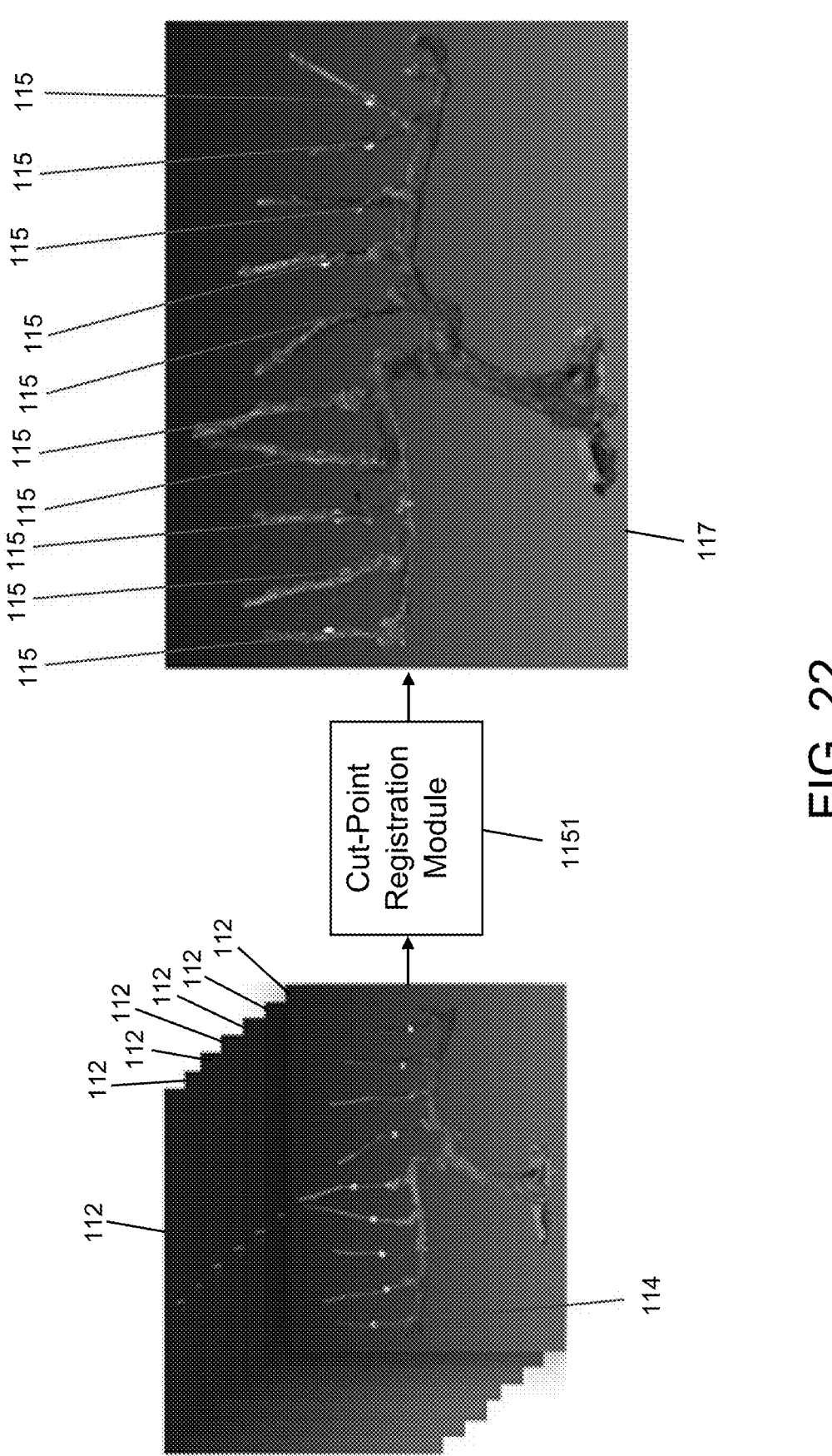
FIG. 22 shows an example of cut-point registration step according to a preferred embodiment of the present invention.

In a preferred embodiment of the present invention, once the sets of three-dimensional cut-points 114 (e.g., the first through seventh sets of three-dimensional cut-points 114) have been generated during the cut-point projection step S8, the sets of three-dimensional cut-points 114 are combined/aligned with each other during the cut-point registration step S9 to form a set of mega cut-points 115. For illustrative purposes, FIG. 22 shows the sets of three-dimensional cut-points 114 on three-dimensional cut-point clouds 112 that correspond to the plurality of viewpoints, and the set of mega cut-points 115 on a mega cut-point cloud 117. The mega cut-point cloud 117 can be formed by merging the set of mega cut-points 115 and the mega point cloud 116 generated during the point cloud registration step S6.

In a preferred embodiment, the sets of three-dimensional cut-points 114 are combined/aligned with each other by a cut-point registration module 1151 that determines one or more spatial transformations (e.g., scaling, rotation, and translation) that aligns the sets of three-dimensional cut-points 114. For example, similarly to the point cloud registration step S6, the cut-point registration step S9 can be performed based on one or more assumptions including that the horizontal frame 16 is exactly horizontal and not disoriented, and that the physical distance between each of the viewpoints (e.g., viewpoints 0-6) is a predetermined value. Based on such one or more assumptions, it may be necessary only to perform translation along the X-axis (axis of the horizontal frame 16) in-order to obtain the set of mega cut-points 115. In a preferred embodiment, to transform an individual set of three-dimensional cut-points 114 from one viewpoint to another viewpoint, a 4×4 transformation matrix in which each element of the transformation matrix represents translation and rotation information can be used. For example, the 4×4 transformation matrix can be used to sequentially transform each of the sets of three-dimensional cut-points 114 in order to complete the cut-point registration step S9 and generate the set of mega cut-points 115.

The sets of three-dimensional cut-points 114 are generated based on images which were captured at different viewpoints (e.g., viewpoints 0-6 in FIG. 5). Therefore, the sets of three-dimensional cut-points 114 may not perfectly align with each other even after the spatial transformations that are intended to align the sets of three-dimensional cut-points 114 are performed during the cut-point registration step S9. Thus, in order to identify the three-dimensional cut-points 114 that are from different sets of cut-points 114 but represent the same cut-point, i.e., three-dimensional cut-points 114 that represent a same cut-point but are still slightly misaligned from each other even after the sets of three-dimensional cut-points 114 are transformed, each of the three-dimensional cut-points 114 is assigned a search radius (e.g., 4 cm). When the sets of three-dimensional cut-points 114 are combined/aligned to generate the set of mega cut-points 115, the search radius of the three-dimensional cut-point 114 is used to determine if one or more other three-dimensional cut-points 114 from another set of three-dimensional cut-points 114 are located within the search radius of the three-dimensional cut-point 114. If one or more other three-dimensional cut-points 114 are located within the search radius of the three-dimensional cut-point 114, then the three-dimensional cut-point 114 and the one or more other three-dimensional cut-points 114 are merged into a mega cut-point 115 included in the set of mega cut-points 115.

In a preferred embodiment of the present invention, two or more three-dimensional cut-points 114 from different sets of three-dimensional cut-points 114 must be merged together in order to generate a mega cut-point 115. For example, if there is no other three-dimensional cut-point 114 from another set of three-dimensional cut-points 114 located within the search radius of a three-dimensional cut-point 114 when the sets of three-dimensional cut-points 114 are combined/aligned, then a mega cut-point 115 is not generated. As another example, three or more three-dimensional cut-points 114 from different sets of three-dimensional cut-points 114 must be merged together in order to generate a mega cut-point 115. Alternatively, a mega cut-point 115 may be generated based on a single three-dimensional cut-point 114 even if there is no other three-dimensional cut-point 114 from another set of three-dimensional cut-points 114 located within the search radius of the three-dimensional cut-point 114 when the sets of three-dimensional cut-points 114 are combined/aligned.

Figure 23:
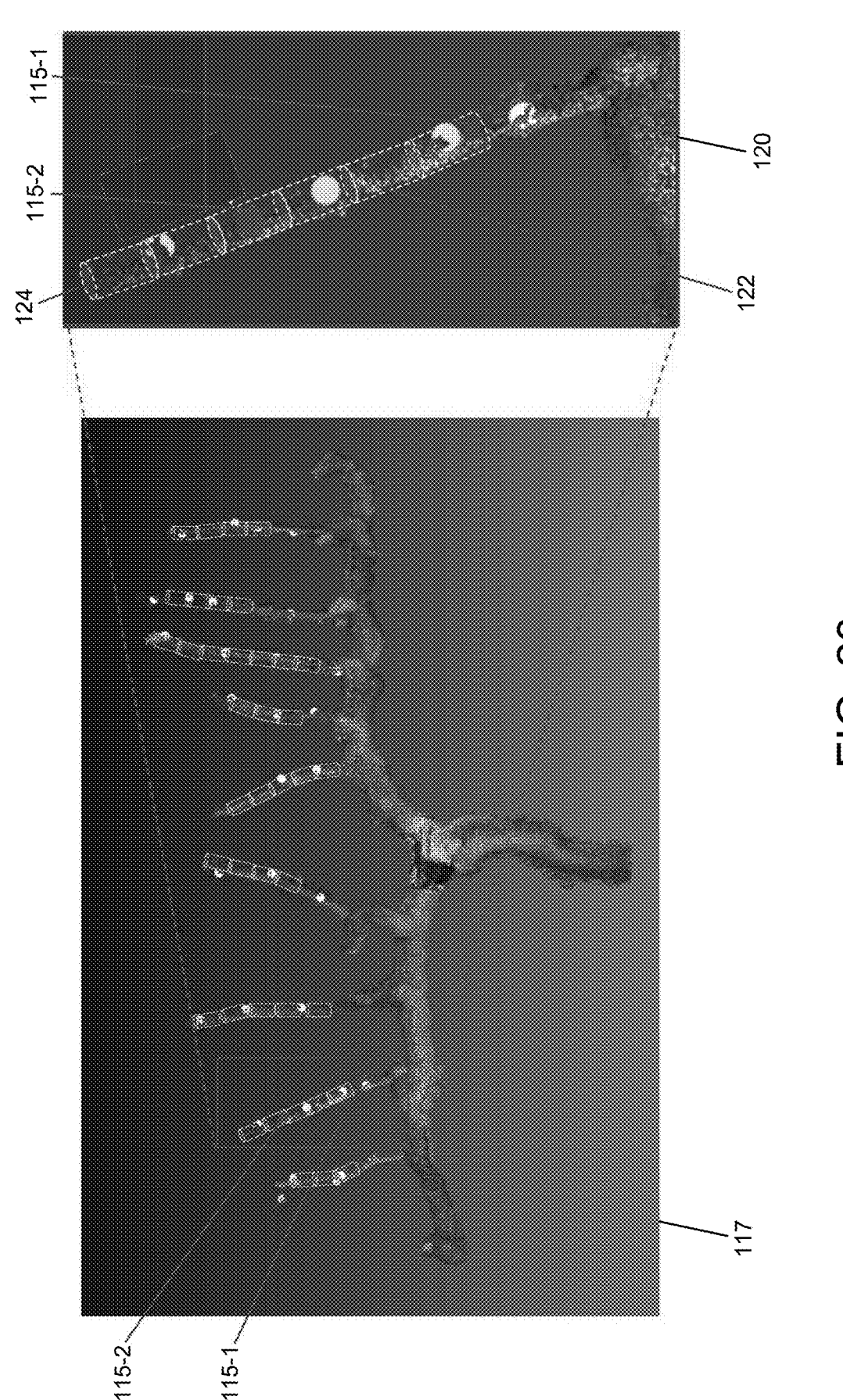
FIG. 23 shows an example of a tracing module according to a preferred embodiment of the present invention.

The set of mega cut-points 115 is generated by combining/aligning the sets of three-dimensional cut-points 114 that were generated based on images captured at different viewpoints (e.g., viewpoints 0-6 in FIG. 5). In some cases, however, the different viewpoints from which the images were captured can cause a first three-dimensional cut-point included in a first set of three-dimensional cut-points 114 to differ greatly in location from a second three-dimensional cut-point included in a second set of three-dimensional cut-points 114 even though the first three-dimensional cut-point and the second three-dimensional cut-point are located on a same particular segment/individual component of the agricultural item (e.g., a same cane). For example, the buds detected for a particular cane based on an image captured from one viewpoint (e.g., viewpoint 6) may differ from the buds detected for the same cane based on an image captured from another viewpoint (e.g., viewpoint 2). As a result, a first three-dimensional cut-point generated based on the image captured from the one viewpoint can differ greatly in location from a second three-dimensional cut-point generated based on an image captured from another viewpoint because the agricultural features detected from the one viewpoint (e.g., viewpoint 6) differ from the agricultural features detected from the another viewpoint (viewpoint 2). For example, there could be a case in which an agricultural feature (e.g., a bud) that was detected based on the image captured from the one viewpoint (e.g., viewpoint 6) might be obscured or otherwise not visible in the image captured from the another viewpoint (e.g., viewpoint 2) such that this same agricultural feature is not detected during the agricultural feature detection step S4 for the image captured from the another viewpoint (viewpoint 2). Additionally, there could be a case in which an agricultural feature is erroneously detected during the agricultural feature detection step S4 for the image captured from the one viewpoint (e.g., viewpoint 6), and not detected during the agricultural feature detection step S4 for the image captured from the another viewpoint (viewpoint 2). In each of these cases, a first three-dimensional cut-point included in a first set of three-dimensional cut-points 114 will differ greatly in location from a second three-dimensional cut-point included in a second set of three-dimensional cut-points 114 even though the first three-dimensional cut-point and the second three-dimensional cut-point are cut-points located on a same particular segment/individual component of the agricultural item (e.g., a same cane). Therefore, when the sets of three-dimensional cut-points 114 are combined/aligned with each other during the cut-point registration step S9, a first mega cut-point 115-1 will be generated based on the first three-dimensional cut-point and a second mega cut-point 115-2 for the same cane will be generated based on the second three-dimensional cut-point because the first three-dimensional cut-point and the second three-dimensional cut-point are not located within each other's search radius, and thus, are not merged with each other during the cut-point registration step S9. For example, FIG. 23 shows a first mega cut-point 115-1 which was generated based on a first three-dimensional cut-point generated based on images captured at one viewpoint and a second mega cut-point 115-2 which was generated based on a second three-dimensional cut-point generated based on the images captured at another viewpoint.

In a preferred embodiment of the present invention, it is desirable only to have one mega cut-point 115 for each particular segment/individual component of the agricultural item. That is, it is desirable only to have one mega cut-point 115 for each cane of the grape vine. Therefore, a preferred embodiment of the present invention includes a tracing module 120 that can be used to identify and remove one or more mega cut-points 115 if more than one mega cut-point 115 is assigned to a particular segment/individual component of the agricultural item of interest. For example, the tracing module 120 can be used to identify and remove one or more mega cut-points 115 if more than one mega cut-points 115 is assigned to a cane of the grape vine.

In a preferred embodiment of the present invention, the mega cut-points 115 generated during the cut-point registration step S9 are merged with the mega point cloud 116 generated during the point cloud registration step S6 to form a mega cut-point cloud 117 during the mega registration step S10. The mega cut-point cloud 117 is used by the tracing module 120. As shown in FIG. 23, for example, the tracing module 120 fits a cylinder 122 around a particular segment of the agricultural item of interest and traces the particular segment starting from a first mega cut-point 115 (first mega cut-point 115-1) located closest to the connection point between the spur and the cane. The tracing module 120 can determine that the mega cut-point 115-1 is located closest to the connection point between the spur and the cane using the spur mask 56 and the cane mask 58 included in one or more of the segmented images 51 generated during the component segmentation step S3. The cane mask 58 included in one or more of the segmented images 51 can be projected into three-dimensional coordinates using the corresponding one or more disparity maps 46 to determine the three-dimensional space of the cane, around which the cylinder 122 traces. The tracing module 120 uses the cylinder 122 to trace the particular segment of the agricultural item of interest from the first mega cut-point 115-1 until a free end 124 of the particular segment is reached. If more than one mega cut-point 115 is present in the region traced by the cylinder 122, the one or more mega cut-points subsequent to the first mega cut-point can be identified as a false mega cut-point and removed from the set of mega cut-points 115. In the example shown in FIG. 23, the second mega cut-point 115-2 is identified as a false mega cut-point and removed from the set of mega cut-points 115. As a result, the first mega cut-point 115-1 is left as the only remaining mega cut-point for the particular cane traced by the tracing module 120. In a preferred embodiment, each of the canes represented in the mega cut-point cloud 117 can be simultaneously traced by a different cylinder 122 of the tracing module 120. Alternatively, the tracing module 120 can be used to trace each of the canes in series (one after another) until each of the canes have been traced by the tracing module 120.

In a preferred embodiment of the present invention, a mega cut-point angle can be determined for each of the one or more mega cut-points 115. The mega cut-point angle is an angle in which the blade portion 24b of the cutting tool 24 is orientated when the cutting operation is executed at the mega cut-point 115. In a preferred embodiment, the mega cut-point angle can be determined based on the cut-point angles of the cut-points 108 that correspond to the mega cut-point 115. For example, if the mega cut-point 115 corresponds to cut-points 108 generated from each of the plurality of viewpoints, the cut-point angles of these cut-points 108 are averaged to determine the mega cut-point angle. Alternatively, the angles of the portions of cane on which the cut-points 108 are located can be averaged to determine the mega cut-point angle.

In a preferred embodiment of the present invention, the manipulation step S11 shown in FIG. 4 can be performed based on the set of mega cut-points 115. The manipulation step S11 includes controlling one or more of the horizontal frame motor 28, the vertical frame motor 30, the robotic arm 22, or the robotic arm mount assembly 23 to position the blade portion 24b of the cutting tool 24 to perform a cutting operation at the mega cut-point 115. In a preferred embodiment, the one or more of the horizontal frame motor 28, the vertical frame motor 30, the robotic arm 22, or the robotic arm mount assembly 23 are controlled through a Robot Operating System (ROS) and a free-space motion planning framework, such as "MoveIt!", which is used to plan motions of the robotic arm 22 and the cutting tool 24 between two points in space without collision. For example, the free-space motion planning framework can plan motions of the robotic arm 22 and the cutting tool 24 between two points in space without colliding into any portion of the agricultural item of interest using information from the mega cut-point cloud 117 which provides the real-world coordinates of the mega cut-points 115 and the agricultural item of interest. More specifically, manipulation step S11 can include positioning the blade portion 24b of the cutting tool 24 based on a cut-point mark which is a location in which the mega cut-point 115 is matched to a location on the blade portion 24b of the cutting tool 24.

In a preferred embodiment of the present invention discussed above, the agricultural feature detection step S4, in which a particular agricultural feature of the agricultural item of interest is detected, is distinct from the component segmentation step S3. However, in another preferred embodiment of the present invention, the component segmentation step S3 can include identifying the particular agricultural feature of the agricultural item of interest. For example, in a case in which the agricultural item of interest is a grape vine, the component segmentation step S3 can include identifying the buds of the grape vine when identifying the different segments of the grape vine. For example, the component segmentation step S3 can be performed using an instance segmentation AI architecture 50 that identifies different segments of the grape vine including the trunk, each individual cordon, each individual spur, each individual cane, and each individual bud. In this case, the agricultural feature locations 95 can be determined based on the results of the component segmentation step S3 such as agricultural feature masks (bud masks) output by the instance segmentation AI architecture 50. Therefore, a separate agricultural feature detection step S4 may not be necessary.

Figure 24:
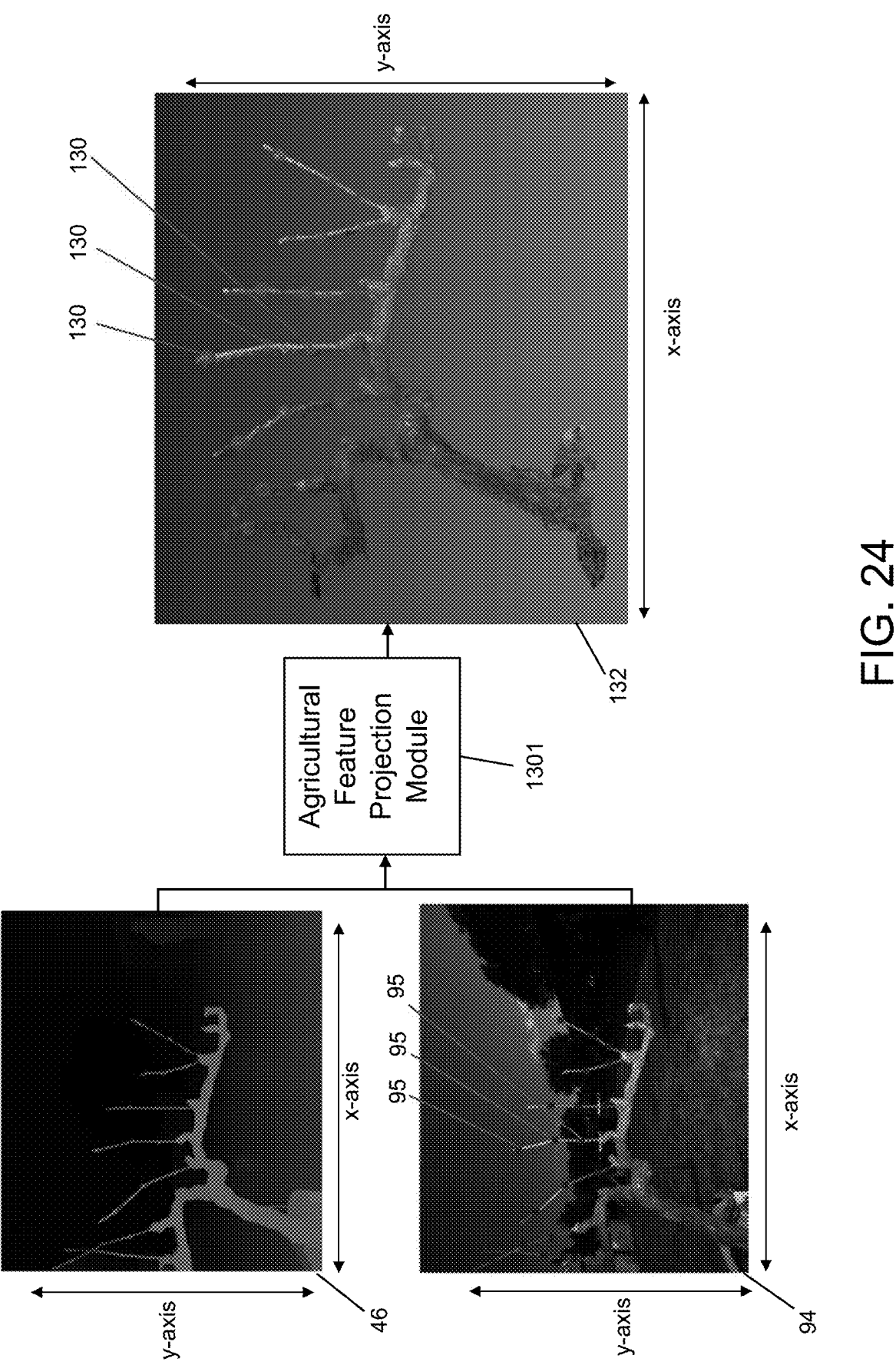
FIG. 24 shows an example of an agricultural feature projection step according to a preferred embodiment of the present invention.

In a preferred embodiment of the present invention, the agricultural feature locations 95 of the agricultural features detected during the agricultural feature detection step S4 are defined in two dimensions. For example, the agricultural feature locations 95 are defined by the x-coordinate and y-coordinate of a point of the bounding box 96 that surrounds the agricultural feature. The agricultural feature projection step S12 includes using an agricultural feature projection module 1301 to generate three-dimensional agricultural features 130. As shown in FIG. 24, the agricultural feature projection module 1301 receives inputs including a set of two-dimensional agricultural feature locations 95 generated during the agricultural feature detection step S4 and a corresponding disparity map 46 generated during the disparity estimation step S2. In FIG. 24, the set of two-dimensional agricultural feature locations 95 are shown on a feature image 94. For example, the inputs to the agricultural feature projection module 1301 can include the agricultural feature locations 95 detected during the agricultural feature detection step S4 based on image L0, and a corresponding disparity map 46 generated during the disparity estimation step S2 based on image L0 and image R0. That is, the agricultural feature locations 95 and the corresponding disparity map 46 are both generated based on images captured from a same viewpoint, for example, viewpoint 0 shown in FIG. 5.

In a preferred embodiment, the agricultural feature projection module 1301 outputs the three-dimensional agricultural features 130. For illustrative purposes, in FIG. 24, the three-dimensional agricultural features 130 are shown on a three-dimensional agricultural feature cloud 132. The agricultural feature projection module 1301 generates a three-dimensional agricultural feature 130 by slicing the location of an agricultural feature (the agricultural feature location 95) from the disparity map 46, and reprojecting the sliced disparity with known camera configurations of the camera (e.g., camera 20) to generate the three-dimensional agricultural feature 130 that corresponds to the agricultural feature with the two-dimensional agricultural feature location 95. For example, a pixel of the feature image 94 that includes the two-dimensional agricultural feature location 95 can be identified, and then a corresponding pixel can be identified in the disparity map 46. The depth value of the corresponding pixel from the disparity map 46 can be used as the depth value of the two-dimensional agricultural feature with the agricultural feature location 95. In this way, the two-dimensional agricultural feature can be projected to a three-dimensional agricultural feature 130 that has X, Y, and Z coordinates.

In a preferred embodiment of the present invention, the agricultural feature projection step S12 includes generating a set of three-dimensional agricultural features 130 for each of the plurality of viewpoints (e.g., viewpoints 0-6) from which images were captured by the camera 20 during the image capture step S1. For example, the agricultural feature projection module 1301 can be used to generate a first set of three-dimensional agricultural features 130 using the agricultural feature locations 95 from the feature image 94-0 and the disparity map 46-0, a second set of three-dimensional agricultural features 130 using the agricultural feature locations 95 from the feature image 94-1 and the disparity map 46-1, a third set of three-dimensional agricultural features 130 using the agricultural feature locations 95 from the feature image 94-2 and the disparity map 46-2, a fourth set of three-dimensional agricultural features 130 using the agricultural feature locations 95 from the feature image 94-3 and the disparity map 46-3, a fifth set of three-dimensional agricultural features 130 using the agricultural feature locations 95 from the feature image 94-4 and the disparity map 46-4, a sixth set of three-dimensional agricultural features 130 using the agricultural feature locations 95 from the feature image 94-5 and the disparity map 46-5, and a seventh set of three-dimensional agricultural features 130 from the agricultural feature locations 95 from the feature image 94-6 and the disparity map 46-6.

Figure 25:
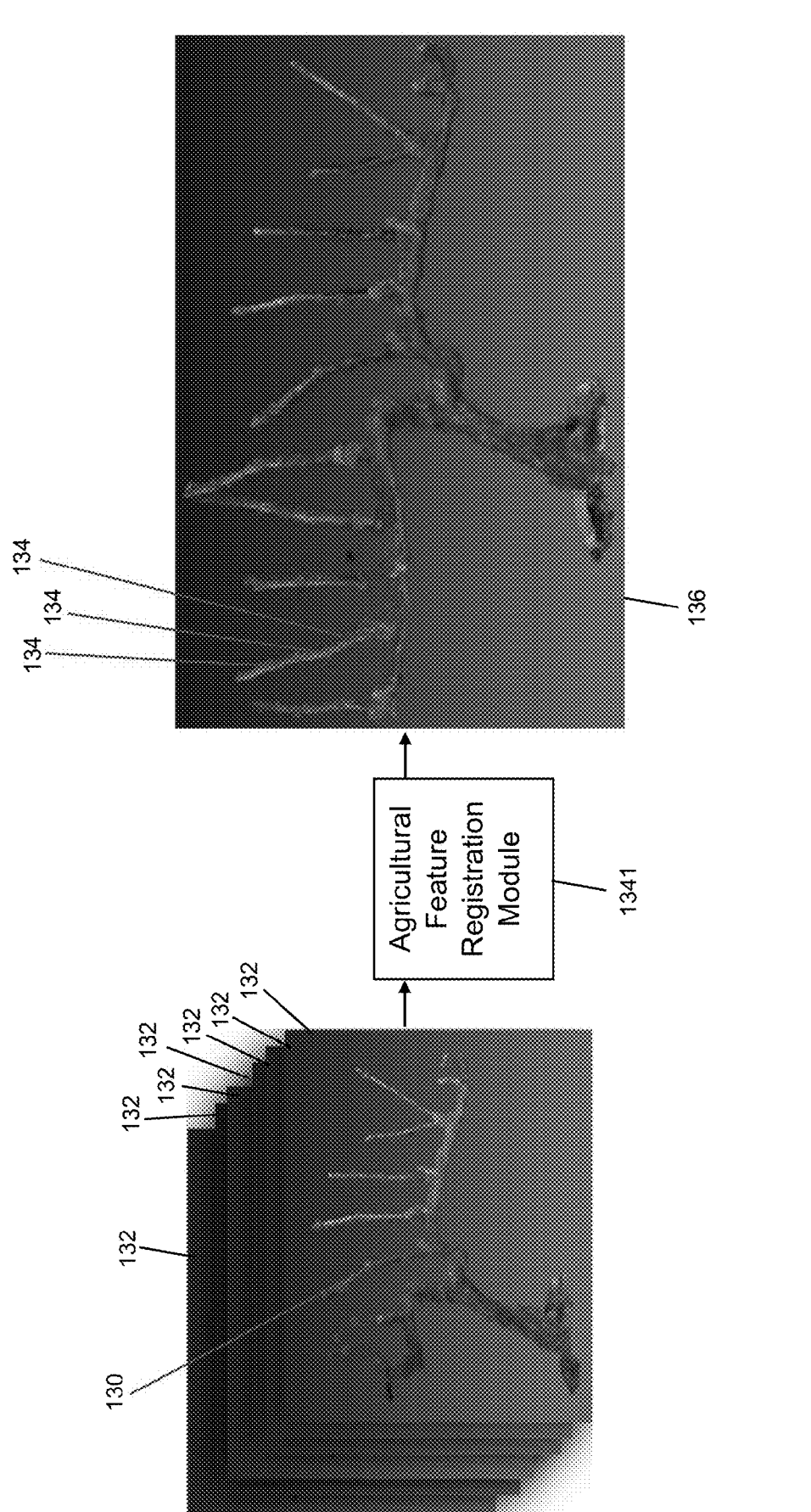
FIG. 25 shows an example of an agricultural feature registration step according to a preferred embodiment of the present invention.

Once the sets of three-dimensional agricultural features 130 (e.g., the first through seventh sets of three-dimensional agricultural features 130) have been generated during the agricultural feature projection step S12, the sets of three-dimensional agricultural features 130 are combined/aligned with each other during the agricultural feature registration step S13 to form a set of mega agricultural features 134. For illustrative purposes, FIG. 25 shows the sets of three-dimensional agricultural features 130 on three-dimensional agricultural feature clouds 132 that correspond to the plurality of viewpoints, and the set of mega agricultural features 134 on a mega agricultural feature cloud 136. The mega agricultural feature cloud 136 can be formed by merging the set of mega agricultural features 134 and the mega point cloud 116 generated during the point cloud registration step S6.

In a preferred embodiment, an agricultural feature registration module 1341 is used to combine/align the sets of three-dimensional agricultural features 130 by determining one or more spatial transformation (e.g., scaling, rotation, and translation) that aligns the sets of three-dimensional agricultural features 130. For example, similarly to the point cloud registration step S6 and the cut-point registration step S9, the agricultural feature registration step S13 can be performed based on one or more assumptions including that the horizontal frame 16 is exactly horizontal and not disoriented, and that the physical distance between each of the viewpoints (e.g., viewpoints 0-6) is a predetermined value. Based on such one or more assumptions, it may be necessary only to perform translation along the X-axis (axis of the horizontal frame 16) in-order to obtain the set of mega agricultural features 134. In a preferred embodiment, to transform an individual set of three-dimensional agricultural features 130 from one viewpoint to another viewpoint, a 4×4 transformation matrix in which each element of the transformation matrix represents translation and rotation information can be used. For example, the 4×4 transformation matrix can be used to sequentially transform each of the sets of three-dimensional agricultural features 130 in order to complete the agricultural feature registration step S13 and generate the set of mega agricultural features 134.

The sets of three-dimensional agricultural features 130 are generated based on images which were captured at different viewpoints (e.g., viewpoints 0-6 in FIG. 5). Therefore, the sets of three-dimensional agricultural features 130 may not perfectly align with each other even after the one or more spatial transformations that are intended to align the sets of three-dimensional agricultural features 130 are performed during the agricultural feature registration step S13. Thus, in order to identify the three-dimensional agricultural features 130 that are from different sets of agricultural features but represent the same agricultural feature, i.e., three-dimensional agricultural features 130 that represent a same agricultural feature but are still slightly misaligned from each other even after the sets of three-dimensional agricultural features 130 are transformed, each of the three-dimensional agricultural features 130 is assigned a search radius (e.g., about 4 cm). When the sets of three-dimensional agricultural features 130 are combined/aligned to generate the set of mega agricultural features 134, the search radius of the three-dimensional agricultural feature 130 is used to determine if one or more other three-dimensional agricultural features 130 from another set of three-dimensional agricultural features 130 are located within the search radius of the three-dimensional agricultural feature 130. If one or more other three-dimensional agricultural features 130 are located within the search radius of the three-dimensional agricultural feature 130, then the three-dimensional agricultural feature 130 and the one or more other three-dimensional agricultural features 130 are merged into a mega agricultural feature 134 included in the set of mega agricultural features 134.

In a preferred embodiment of the present invention, two or more three-dimensional agricultural features 130 from different sets of three-dimensional agricultural features must be merged together in order to generate a mega agricultural feature 134. For example, if there is no other three-dimensional agricultural feature 130 from another set of three-dimensional agricultural features located within the search radius of a three-dimensional agricultural features 130 when the sets of agricultural features 130 are combined/aligned, then a mega agricultural feature 134 is not generated. As another example, three or more three-dimensional agricultural features 130 from different sets of three-dimensional agricultural features 130 are merged together in order to generate a mega agricultural feature 134. Alternatively, a mega agricultural feature 134 may still be generated based on a single three-dimensional agricultural feature 130 even if there is no other three-dimensional agricultural feature 130 from another set of three-dimensional agricultural features 130 located within the search radius of the three-dimensional agricultural feature 130 when the sets of three-dimensional agricultural features 130 are combined/aligned.

In a preferred embodiment of the present invention, the images captured during the image capture step S1, the disparity maps 46, the segmented images 51, the feature images 94, the point clouds 49, the mega point cloud 116, the cut-point images 106, the three-dimensional cut-point clouds 112, the mega cut-point cloud 117, the three-dimensional agricultural feature cloud 132, and the mega agricultural feature cloud 136, or portions thereof, can be saved as data structures to perform the various steps discussed above. However, one or more of the images captured during the image capture step S1, the disparity maps 46, the segmented images 51, the feature images 94, the point clouds 49, the mega point cloud 116, the cut-point images 106, the three-dimensional cut-point clouds 112, the mega cut-point cloud 117, the three-dimensional agricultural feature cloud 132, and the mega agricultural feature cloud 136, or portions thereof, can also be displayed to a user, for example, on the display device 43 or through the user platform.

As discussed above, the processor and memory components of the imaging electronics 42 can be configured or programmed to control the one or more devices, including the camera 20, the robotic arm 22, the robotic arm mount assembly 23, and the cutting tool 24, as well as be configured or programmed to process image data obtained by the camera 20. In a preferred embodiment of the present invention, the processor and memory components of the imaging electronics 42 are configured or programmed to perform the functions discussed above including the disparity estimation step S2, the component segmentation step S3, the agricultural feature detection step S4, the point cloud generation step S5, the point cloud registration step S6, the cut-point generation step S7, the cut-point projection step S8, the cut-point registration step S9, the mega registration step S10, the manipulation step S11, the agricultural feature projection step S12, and the agricultural feature registration step S13. In other words, the processor and memory components of the imaging electronics 42 can be configured or programmed to define and function as components including the AI disparity estimation model 44, the instance segmentation AI architecture 50, the object detection model 92, the point cloud generation module 491, the point cloud registration module 1161, the cut-point generation module 104, the cut-point projection module 110, the cut-point registration module 1151, the tracing module 120, the agricultural feature projection module 1301, and the agricultural feature registration module 1341 discussed above.

In a preferred embodiment of the present invention discussed above, the agricultural item of interest is a grape vine. However, preferred embodiments of the present invention are applicable to other agricultural item of interests such as fruit trees and flowering plants such as rose bushes.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method for generating an agricultural cut-point for an agricultural item, the method comprising:

capturing an image of the agricultural item;

generating a depth estimation of the agricultural item;

segmenting the image of the agricultural item to generate a segmented image that identifies different segments of the agricultural item;

detecting an agricultural feature of the agricultural item based on the image of the agricultural item;

generating a two-dimensional cut-point based on the segmented image and the agricultural feature; and generating a three-dimensional cut-point based on the two-dimensional cut-point and the depth estimation of the agricultural item; and determining agricultural feature locations of a plurality of agricultural features of the agricultural item including the agricultural feature; wherein the generating the two-dimensional cut-point includes:

associating the plurality of agricultural features to a particular segment of the different segments of the agricultural item based on the agricultural feature locations;

assigning each of the plurality of agricultural features an identifier with respect to the particular segment to which the plurality of agricultural features was associated; and generating the two-dimensional cut-point based on the identifiers assigned to the plurality of agricultural features.

2. The method of claim 1, wherein the generating the depth estimation of the agricultural item, the segmenting the image of the agricultural item, and the detecting the agricultural feature are simultaneously performed.

3. The method of claim 1, wherein the capturing the image of the agricultural item includes capturing a plurality of images of the agricultural item from a plurality of viewpoints; and the plurality of images are captured using a camera that is moved to the plurality of viewpoints.

4. The method of claim 1, wherein the generating the depth estimation of the agricultural item includes generating a disparity estimation using an Artificial Intelligence disparity estimation model.

5. The method of claim 1, further comprising:

generating a point cloud based on the depth estimation of the agricultural item; and removing one or more points of the point cloud when the one or more points have a depth greater than a depth-based threshold.

6. The method of claim 5, wherein the depth-based threshold is set based on a workable range of a cutting system used to execute a cutting operation at the three-dimensional cut-point.

7. The method of claim 1, further comprising:

generating a point cloud based on the depth estimation of the agricultural item; and removing one or more points from the point cloud based on a density of points included in the point cloud.

8. The method of claim 1, wherein the segmented image is generated using an instance segmentation Artificial Intelligence architecture.

9. The method of claim 1, wherein the determining the agricultural feature locations of the plurality of agricultural features of the agricultural item, including the agricultural feature, includes using an object detection model that receives the image of the agricultural item and detects the agricultural features within the image of the agricultural item.

10. The method of claim 1, wherein the segmented image includes masks that identify the different segments of the agricultural item;

the masks that identify the different segments include a particular mask that identifies the particular segment; and the plurality of agricultural features are associated to the particular segment when the agricultural feature locations of the plurality of agricultural features are within the particular mask or are within a predetermined distance of the particular mask.

11. The method of claim 10, wherein the identifiers are assigned to the plurality of agricultural features based on respective distances between the agricultural feature locations and a point of the particular mask.

12. The method of claim 11, wherein the two-dimensional cut-point is generated at a point between two of the plurality of agricultural features based on the identifiers assigned to the plurality of agricultural features.

13. The method of claim 12, further comprising moving the two-dimensional cut-point such that the two-dimensional cut-point is located within the particular mask when the two-dimensional cut-point generated at the point between the plurality of agricultural features is not located within the particular mask.

14. The method of claim 12, further comprising:

determining an angle of a portion of the particular segment on which the two-dimensional cut-point is generated based on the agricultural feature locations of the two of the plurality of agricultural features; and determining a cut-point angle of the two-dimensional cut-point based on the angle of the portion of the particular segment on which the two-dimensional cut-point is generated.

15. The method of claim 1, wherein the agricultural feature of the agricultural item is detected based on the segmented image.

16. The method of claim 1, further comprising:

combining a plurality of three-dimensional cut-points to generate a mega three-dimensional cut-point; wherein the capturing the image of the agricultural item includes capturing a plurality of images of the agricultural item from a plurality of viewpoints;

the generating the depth estimation of the agricultural item includes generating a plurality of depth estimations of the agricultural item that respectively correspond to the plurality of images;

the segmenting the image of the agricultural item includes generating a plurality of segmented images that respectively correspond to the plurality of images;

the detecting the agricultural feature of the agricultural item includes detecting the agricultural feature of the agricultural item in each of the plurality of images;

the generating the two-dimensional cut-point includes generating a plurality of two-dimensional cut-points based on the plurality of segmented images and the agricultural features, the plurality of two-dimensional cut-points respectively correspond to the plurality of viewpoints;

the generating the three-dimensional cut-point includes generating the plurality of three-dimensional cut-points based on the plurality of two-dimensional cut-points and the plurality of depth estimations of the agricultural item, the plurality of three-dimensional cut-points respectively correspond to the plurality of viewpoints.

17. The method of claim 16, wherein the combining the plurality of three-dimensional cut-points to generate the mega three-dimensional cut-point includes:

assigning a search radius to each of the plurality of three-dimensional cut-points;

performing one or more spatial transformations to align the plurality of three-dimensional cut-points; and merging the plurality of three-dimensional cut-points into the mega three-dimensional cut-point when the plurality of three-dimensional cut-points are located within the search radius assigned to one of the plurality of three-dimensional cut-points.

18. The method of claim 16, further comprising:

generating a plurality of point clouds based on the plurality of depth estimations of the agricultural item, the plurality of point clouds respectively correspond to the plurality of viewpoints;

combining the plurality of point clouds to generate a mega point cloud;

merging the mega three-dimensional cut-point and the mega point cloud;

tracing a portion of the mega point cloud that corresponds to a segment of the agricultural item on which the mega three-dimensional cut-point is located to determine if an additional mega three-dimensional cut-point is located on the segment of the agricultural item; and removing the additional mega three-dimensional cut-point when the additional mega three-dimensional cut-point is determined to be located on the segment of the agricultural item.

19. The method of claim 16, further comprising:

determining if an additional mega three-dimensional cut-point is located on a segment of the agricultural item on which the mega three-dimensional cut-point is located; and removing the additional mega three-dimensional cut-point when the additional mega three-dimensional cut-point is determined to be located on the segment of the agricultural item.

20. The method of claim 16, further comprising:

determining a plurality of cut-point angles that correspond to the plurality of two-dimensional cut-points, the plurality of cut-point angles being determined based on angles of portions of particular segments of the agricultural item on which the plurality of two-dimensional cut-points are generated; and determining a mega cut-point angle for the mega three-dimensional cut-point based on the plurality of cut-point angles.

21. The method of claim 1, wherein the generating the depth estimation of the agricultural item includes generating a disparity estimation based on the image of the agricultural item.

22. The method of claim 1, wherein the generating the depth estimation of the agricultural item includes obtaining point cloud data from a LIDAR sensor.

23. A method for generating an agricultural cut-point for an agricultural item, the method comprising:

capturing an image of the agricultural item;

generating a depth estimation of the agricultural item;

segmenting the image of the agricultural item to generate a segmented image that identifies different segments of the agricultural item;

detecting an agricultural feature of the agricultural item based on the image of the agricultural item;

generating a two-dimensional cut-point based on the segmented image and the agricultural feature;

generating a three-dimensional cut-point based on the two-dimensional cut-point and the depth estimation of the agricultural item; and training an instance segmentation Artificial Intelligence architecture using a segmentation dataset tailored to an instant segmentation task with respect to the agricultural item; wherein the segmented image is generated using the instance segmentation Artificial Intelligence architecture;

the segmentation dataset includes a plurality of annotated images of the agricultural item;

the plurality of annotated images include masks formed around segments of the agricultural item; and at least one of the plurality of annotated images includes discrete portions of a same segment assigned a same label.

24. A system for generating an agricultural cut-point for an agricultural item, the system comprising:

a camera to capture an image of the agricultural item; and a processor configured or programmed to:

segment the image of the agricultural item to generate a segmented image that identifies different segments of the agricultural item;

detect an agricultural feature of the agricultural item based on the image of the agricultural item;

generate a two-dimensional cut-point based on the segmented image and the agricultural feature;

generate a three-dimensional cut-point based on the two-dimensional cut-point and a depth estimation of the agricultural item; and determine agricultural feature locations of a plurality of agricultural features of the agricultural item including the agricultural feature; wherein to generate the two-dimensional cut-point, the processor is configured or programmed to:

associate the plurality of agricultural features to a particular segment of the different segments of the agricultural item based on the agricultural feature locations;

assign each of the plurality of agricultural features an identifier with respect to the particular segment to which the plurality of agricultural features was associated; and generate the two-dimensional cut-point based on the identifiers assigned to the plurality of agricultural features.

\*  \*  \*  \*  \*